US009832799B2

(12) United States Patent
Morita et al.

(10) Patent No.: US 9,832,799 B2
(45) Date of Patent: Nov. 28, 2017

(54) MOBILE COMMUNICATION SYSTEM, USER TERMINAL, AND BASE STATION

(71) Applicant: KYOCERA CORPORATION, Kyoto (JP)

(72) Inventors: Kugo Morita, Yokohama (JP); Akinori Iwabuchi, Machida (JP); Tohru Sunaga, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 168 days.

(21) Appl. No.: 14/769,061

(22) PCT Filed: Feb. 18, 2014

(86) PCT No.: PCT/JP2014/053743
§ 371 (c)(1),
(2) Date: Aug. 19, 2015

(87) PCT Pub. No.: WO2014/129453
PCT Pub. Date: Aug. 28, 2014

(65) Prior Publication Data
US 2015/0382392 A1 Dec. 31, 2015

Related U.S. Application Data

(60) Provisional application No. 61/766,518, filed on Feb. 19, 2013.

(51) Int. Cl.
*H04W 76/02* (2009.01)
*H04W 72/04* (2009.01)
(Continued)

(52) U.S. Cl.
CPC .......... *H04W 76/023* (2013.01); *H04W 4/24* (2013.01); *H04W 8/005* (2013.01); *H04W 72/04* (2013.01); *H04W 88/04* (2013.01); *H04W 92/18* (2013.01)

(58) Field of Classification Search
None
See application file for complete search history.

(56) References Cited

U.S. PATENT DOCUMENTS 8,264,965 B2    9/2012  Dolganow et al.
8,885,507 B2   11/2014  Chen et al.
(Continued)

FOREIGN PATENT DOCUMENTS

JP    2002-159050 A    5/2002
JP    2008-193666 A    8/2008
(Continued)

OTHER PUBLICATIONS

The extended European search report issued by the European Patent Office dated Sep. 8, 2016, which corresponds to European Patent Application No. 14754928.1-1857 and is related to U.S. Appl. No. 14/769,061.
(Continued)

*Primary Examiner* — Faruk Hamza
*Assistant Examiner* — Alan Lindenbaum
(74) *Attorney, Agent, or Firm* — Studebaker & Brackett PC

(57) ABSTRACT

A mobile communication system according to the embodiment supports cellular communication in which a data path passes through a network and D2D communication that is direct device-to-device communication in which a data path does not pass through the network. A frequency division multiplexing scheme is applied to the cellular communication and a code division multiplexing scheme is applied to the D2D communication. The network assigns a spread code having orthogonality to a user terminal in response to a request from the user terminal. The user terminal performs the D2D communication by using the spread code assigned by the network.

24 Claims, 38 Drawing Sheets

(51) Int. Cl.
*H04W 4/24* (2009.01)
*H04W 8/00* (2009.01)
*H04W 92/18* (2009.01)
*H04W 88/04* (2009.01)

(56) References Cited

U.S. PATENT DOCUMENTS

| | | | |
|---|---|---|---|
| 9,320,067 | B2 | 4/2016 | Ho et al. |
| 2002/0160721 | A1* | 10/2002 | Kanemoto ............ H04B 1/707 455/69 |
| 2009/0116434 | A1 | 5/2009 | Lohr et al. |
| 2009/0325625 | A1* | 12/2009 | Hugl .................... H04W 52/16 455/522 |
| 2010/0075693 | A1 | 3/2010 | Kishigami et al. |
| 2011/0151887 | A1 | 6/2011 | Hakola et al. |
| 2011/0228666 | A1* | 9/2011 | Barbieri ............ H04W 76/023 370/216 |
| 2011/0258327 | A1* | 10/2011 | Phan .................... H04W 16/10 709/227 |
| 2012/0163235 | A1 | 6/2012 | Ho et al. |
| 2012/0243431 | A1* | 9/2012 | Chen ................ H04W 72/0406 370/252 |
| 2013/0124937 | A1* | 5/2013 | Kim ...................... H04L 1/1867 714/748 |
| 2013/0170398 | A1* | 7/2013 | Kwon .................. H04W 8/005 370/255 |
| 2013/0250798 | A1 | 9/2013 | Iwamura et al. |
| 2013/0288608 | A1* | 10/2013 | Fwu ...................... H04W 72/02 455/63.1 |
| 2014/0078952 | A1* | 3/2014 | Bontu ................ H04W 76/023 370/312 |
| 2014/0185495 | A1* | 7/2014 | Kuchibhotla ....... H04W 76/023 370/281 |

FOREIGN PATENT DOCUMENTS

| | | |
|---|---|---|
| JP | 2008-258817 A | 10/2008 |
| JP | 2011-515939 | 5/2011 |
| JP | 2012-085113 A | 4/2012 |
| JP | 2012-119827 A | 6/2012 |
| JP | 2012-213206 A | 11/2012 |
| JP | 2013-523018 | 6/2013 |
| WO | 2011/069295 A1 | 6/2011 |
| WO | 2011/116017 A1 | 9/2011 |
| WO | 2012/088470 A1 | 6/2012 |

OTHER PUBLICATIONS

3rd Generation Partnership Project; Technical Specification Group SA; Feasibility Study for Proximity Services (ProSe) (Release 12); 3GPP TR 22.803 V2.0.0 (Nov. 2012).
International Search Report and Written Opinion of the International Searching Authority for PCT/JP2014/053743, dated Apr. 8, 2014.
Qualcomm Incorporated, "Proposed solution for direct discovery and communication using E-UTRAN"; SA WG2 Meeting #95 S2-130308; Jan. 22, 2013. http://www.3gpp.org/ftp/tsg_$_{sa/WG2}$_Arch/TSGS2_95_Prague/Docs/S2-130308.
An Office Action issued by the Japanese Patent Office dated Sep. 29, 2015, which corresponds to Japanese Patent Application No. 2015-501456 and is related to U.S. Appl. No. 14/769,061; with English language concise explanation.

* cited by examiner

FIG. 14
(A)
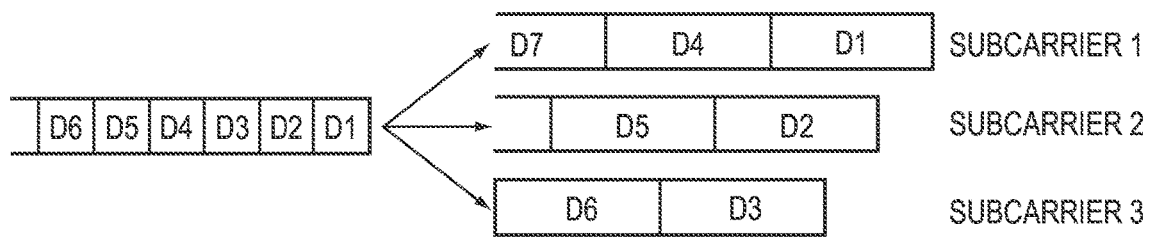
(B)
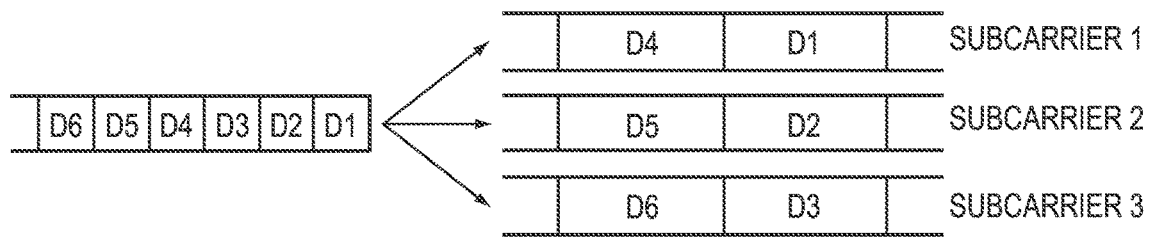

MOBILE COMMUNICATION SYSTEM, USER TERMINAL, AND BASE STATION

TECHNICAL FIELD

The prevent invention relates to a mobile communication system which supports D2D communication.

BACKGROUND ART

In 3GPP (3rd Generation Partnership Project) which is a project aiming to standardize a mobile communication system, it is considered to introduce communication between devices (Device to Device: D2D) as a new function to be specified in Release 12 or subsequent versions (see Non Patent Literature 1).

In the D2D communication, a plurality of neighboring user terminals perform direct communication without passing through a network. That is, a data path of the D2D communication does not pass through the network. On the other hand, a data path of normal communication (cellular communication) of a mobile communication system passes through the network.

CITATION LIST

Non Patent Literature

[Non Patent Literature 1] 3GPP Technical Report "TR 22.803 V2.0.0" November 2012

SUMMARY OF THE INVENTION

A network can easily manage a communication state in cellular communication. In contrast, it is difficult for a network to manage a communication state in D2D communication. Accordingly, there is a problem that a billing operation, for example, is difficult to perform in the D2D communication.

Therefore, the present invention provides a mobile communication system with which it is possible to facilitate an operation for the D2D communication.

A mobile communication system according to the embodiment supports cellular communication in which a data path passes through a network and D2D communication that is direct device-to-device communication in which a data path does not pass through the network. A frequency division multiplexing scheme is applied to the cellular communication and a code division multiplexing scheme is applied to the D2D communication. The network assigns a spread code having orthogonality to a user terminal in response to a request from the user terminal. The user terminal performs the D2D communication by using the spread code assigned by the network.

BRIEF DESCRIPTION OF DRAWINGS

FIG. 14 is a diagram illustrating a data transmission method according to a fourth modification of the first embodiment.

DESCRIPTION OF EMBODIMENTS

Overview of Embodiment

Figure 1:
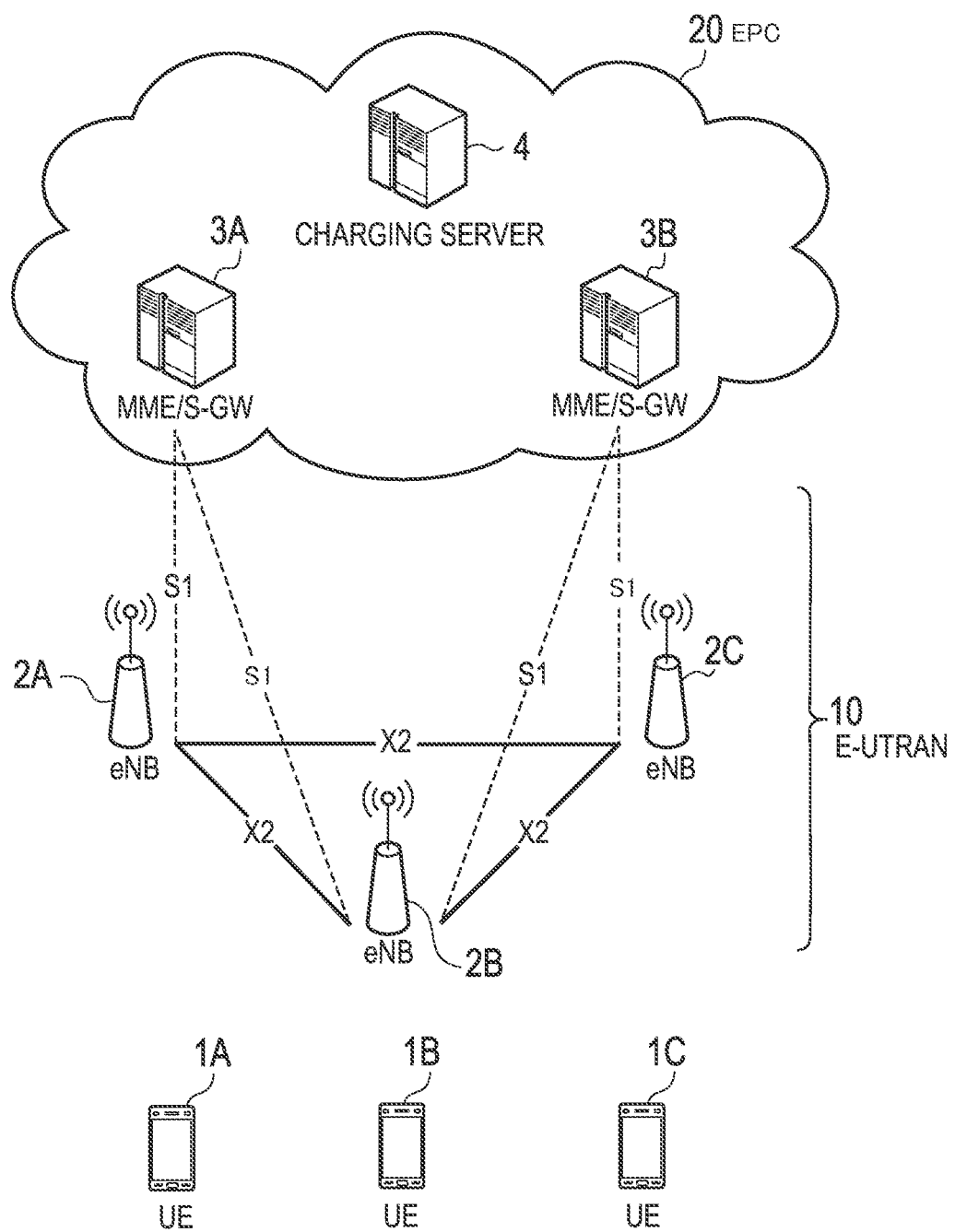
FIG. 1 is a configuration diagram of an LTE system.

A mobile communication system according to the embodiment supports cellular communication in which a data path passes through a network and D2D communication that is direct device-to-device communication in which a data path does not pass through the network. A frequency division multiplexing scheme is applied to the cellular communication and a code division multiplexing scheme is applied to the D2D communication. The network assigns a spread code having orthogonality to a user terminal in response to a request from the user terminal. The user terminal performs the D2D communication by using the spread code assigned by the network.

In the embodiment, the network performs charging for the use of the spread code by the user terminal.

In the embodiment, a valid time is set for the spread code. The user terminal to which the spread code is assigned requests the network to reassign the spread code in order to continue the D2D communication.

In the embodiment, the network controls the valid time on the basis of at least one of an elapsed time of the D2D communication by the user terminal, an application that the user terminal uses for the D2D communication, a billing contract of the user terminal, and movement speed of the user terminal.

In the embodiment, the user terminal requests the network to reassign the spread code in response to detection of deterioration in communication quality of the D2D communication, even before the valid time expires.

In the embodiment, when the user terminal ends the D2D communication before the valid time expires, the user terminal notifies the network of the end of the D2D communication.

In the embodiment, when reassigning the spread code, the network assigns, to the user terminal, a spread code different from the spread code before the reassignment.

In the embodiment, the network assigns, to the user terminal, the spread code for transmission in the D2D communication and the spread code for reception in the D2D communication.

In the embodiment, the network controls a code length of the spread code to be assigned to the user terminal on the basis of at least one of communication quality of the D2D communication in the user terminal and the number of user terminals performing the D2D communication in a cell to which the user terminal belongs.

In the embodiment, when the network determines that the code length of the spread code to be assigned to the user terminal is longer than a predetermined length, the network instructs the user terminal to switch from the D2D communication to the cellular communication.

In the embodiment, the user terminal retains an initial spread code having no orthogonality. The user terminal performs the D2D communication by using the initial spread code even when the spread code is not assigned by the network.

In the embodiment, the user terminal performing the D2D communication by using the initial spread code requests the network to assign the spread code in response to detection of deterioration in communication quality of the D2D communication.

In the embodiment, when the network determines that the communication quality will improve by assigning the spread code, the network assigns the spread code to the user terminal.

In the embodiment, the user terminal performing the D2D communication by using the initial spread code performs transmission in the D2D communication on the basis of a result of monitoring an interference wave signal.

In the embodiment, the network assigns the spread code to a user terminal group including the user terminal and another user terminal which is to perform the D2D communication with the user terminal.

In the embodiment, the user terminal transmits the request to the network on the basis of an increase and decrease in the number of user terminals included in the user terminal group.

In the embodiment, the network controls the number of spread codes to be assigned to the user terminal group on the basis of the number of user terminals included in the user terminal group.

In the embodiment, the network denies the assignment of the spread code to the user terminal group when a user terminal under a billing contract for which the D2D communication is not permitted is included in the user terminal group.

In the embodiment, the network notifies the user terminal of transmission and reception start timing of the D2D communication by using, as a reference, timing of the cellular communication.

In the embodiment, the network comprises a plurality of cells. Each of the plurality of cells notifies a neighboring cell of an assignment situation of the spread code in the self cell.

In the embodiment, the network assigns the spread code to the user terminal on the basis of an identifier associated with the user terminal.

In the embodiment, the user terminal performing the D2D communication by using the spread code performs transmission by applying the spread code to each of a plurality of subcarriers.

In the embodiment, when the user terminal performing the D2D communication transmits data, the user terminal transmits information indicating an application corresponding to the data by adding the information to the data.

In the embodiment, the network broadcasts information indicating a spread code that should be used for a discovery process of discovering a neighboring terminal that should be a communication partner in the D2D communication.

In the embodiment, the network comprises a server device that is shared by a plurality of communication providers and that performs assignment of the spread code.

A user terminal according to the embodiment is used in a mobile communication system that supports cellular communication in which a data path passes through a network, and D2D communication that is direct device-to-device communication in which a data path does not pass through the network. The user terminal comprises: a controller that performs the D2D communication by using a spread code assigned by the network and having orthogonality. A frequency division multiplexing scheme is applied to the cellular communication and a code division multiplexing scheme is applied to the D2D communication.

A base station according to the embodiment is used in a mobile communication system that supports cellular communication in which a data path passes through a network, and D2D communication that is direct device-to-device communication in which a data path does not pass through the network. The base station comprises: a controller that assigns, to a user terminal, a spread code having orthogonality, for the D2D communication, in response to a request from the user terminal. A frequency division multiplexing scheme is applied to the cellular communication and a code division multiplexing scheme is applied to the D2D communication.

First Embodiment

Hereinafter, with reference to the accompanying drawings, a description will be provided for an embodiment in a case where D2D communication is introduced to a mobile communication system (an LTE system) configured on the basis of the 3GPP standards. In addition, in the description of the drawings below, identical or similar symbols are assigned to identical or similar portions.

(Configuration of LTE System)

FIG. 1 is a configuration diagram of an LTE system according to a first embodiment. As illustrated in FIG. 1, the LTE system includes a plurality of UE (User Equipment) 1A to 1C, E-UTRAN (Evolved-UMTS Terrestrial Radio Access Network) 10, and EPC (Evolved Packet Core) 20. The E-UTRAN 10 corresponds to a radio access network and the EPC 20 corresponds to a core network. The E-UTRAN 10 and the EPC 20 configure a network of the LTE system.

The UE 1 is a mobile communication device and performs radio communication with a cell (a serving cell) to which the UE 1 is connected. The UE 1 corresponds to the user terminal.

The E-UTRAN 10 includes a plurality of eNB (evolved Node-B) 2A to 2C. The eNB 2 corresponds to a base station. The eNB 2 manages one or a plurality of cells and performs radio communication with the UE 1 which establishes a connection with the cell of the eNB 2. It is noted that the "cell" is used as a term indicating a minimum unit of a radio communication area, and is also used as a term indicating a function of performing radio communication with the UE 1.

The eNB 2, for example, has a radio resource management (RRM) function, a function of routing user data, and a measurement control function for mobility control and scheduling.

The EPC 20 includes a plurality of MME (Mobility Management Entity)/S-GW (Serving-Gateway) 3A and 3B, and a charging server 4. The MME is a network node that performs various mobility controls and the like for the UE 1 and corresponds to a controller. The S-GW is a network node that performs transfer control of user data and corresponds to a mobile switching center. The charging server 4 is a network node that manages charging for the UE 1. The charging server 4 charges not only for the cellular communication, but also for the D2D communication, however, details thereof will be described later.

The eNBs 2 are connected mutually via an X2 interface. Furthermore, the eNB 2 is connected to the EPC 20 via an S1 interface.

Next, the configurations of the UE 1 and the eNB 2 will be described.

Figure 2:
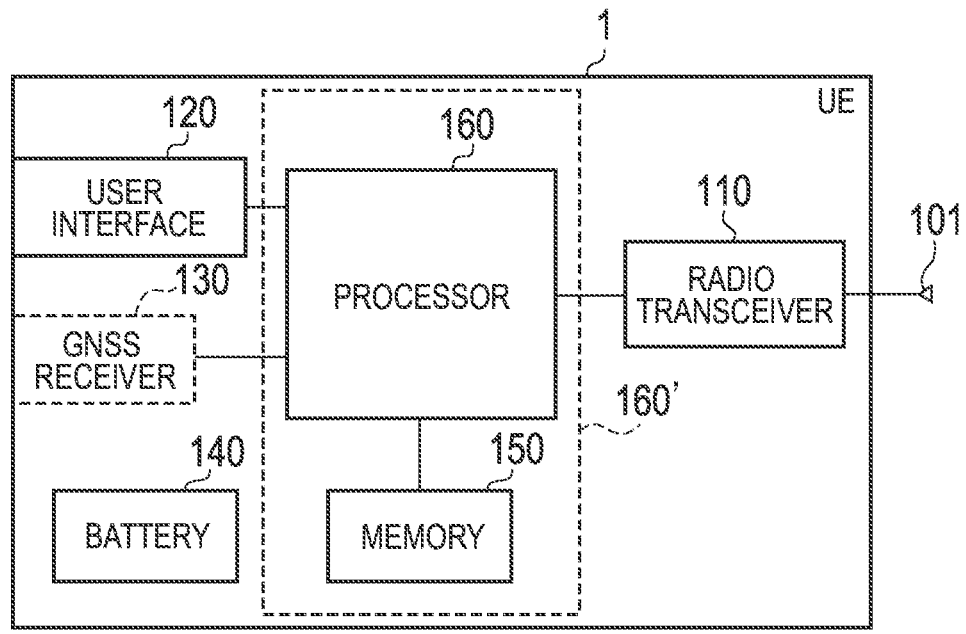
FIG. 2 is a block diagram of the UE.

FIG. 2 is a block diagram of the UE 1. As illustrated in FIG. 2, the UE 1 includes an antenna 101, a radio transceiver 110, a user interface 120, a GNSS (Global Navigation Satellite System) receiver 130, a battery 140, a memory 150, and a processor 160. The memory 150 and the processor 160 configure a controller. The UE 1 may not have the GNSS receiver 130. Furthermore, the memory 150 may be integrally formed with the processor 160, and this set (that is, a chipset) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 1, and includes, for example, a display, a microphone, a speaker, and various buttons. The user interface 120 receives an operation from a user and outputs a signal indicating the content of the operation to the processor 160. The GNSS receiver 130 receives a GNSS signal in order to obtain location information indicating a geographical location of the UE 1, and outputs the received signal to the processor 160. The battery 140 accumulates a power to be supplied to each block of the UE 1.

The memory 150 stores a program to be executed by the processor 160 and information to be used for a process by the processor 160. The processor 160 includes a baseband processor that performs modulation and demodulation, encoding and decoding and the like on the baseband signal, and a CPU (Central Processing Unit) that performs various processes by executing the program stored in the memory 150. The processor 160 may further include a codec that performs encoding and decoding on sound and video signals. The processor 160 executes various processes and various communication protocols described later.

Figure 3:
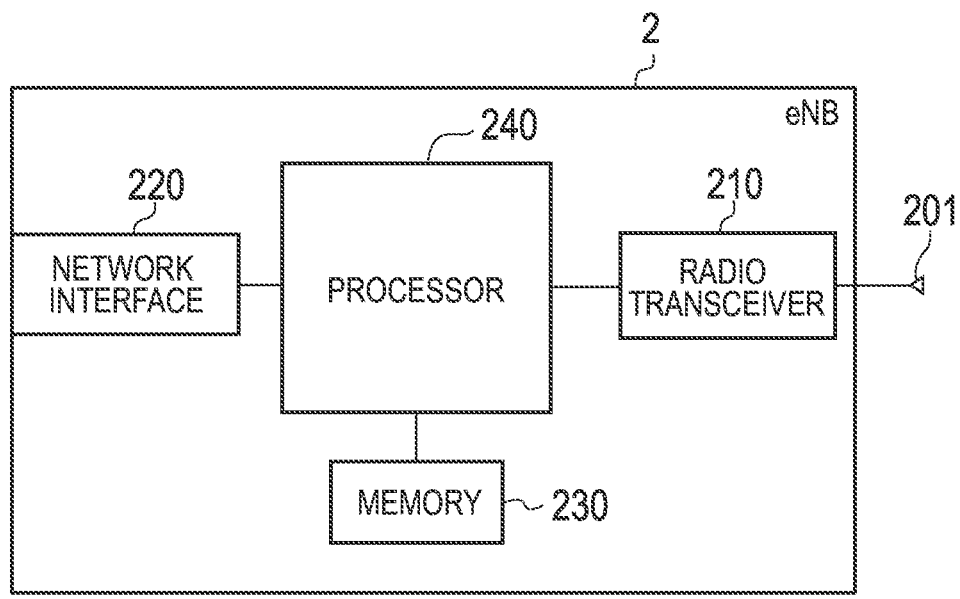
FIG. 3 is a block diagram of the eNB.

FIG. 3 is a block diagram of the eNB 2. As illustrated in FIG. 3, the eNB 2 includes an antenna 201, a radio transceiver 210, a network interface 220, a memory 230, and a processor 240. The memory 230 and the processor 240 configure a controller.

The antenna 201 and the radio transceiver 210 are used to transmit and receive a radio signal. The antenna 201 includes a plurality of antenna elements. The radio transceiver 210 converts the baseband signal output from the processor 240 into the radio signal, and transmits the radio signal from the antenna 201. Furthermore, the radio transceiver 210 converts a radio signal received by the antenna 201 into the baseband signal, and outputs the baseband signal to the processor 240.

The network interface 220 is connected to a neighboring eNB 2 via an X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240. The processor 240 includes the baseband processor that performs modulation and demodulation, encoding and decoding and the like on the baseband signal and a CPU that performs various processes by executing the program stored in the memory 230. The processor 240 executes various processes and various communication protocols described later.

Figure 4:
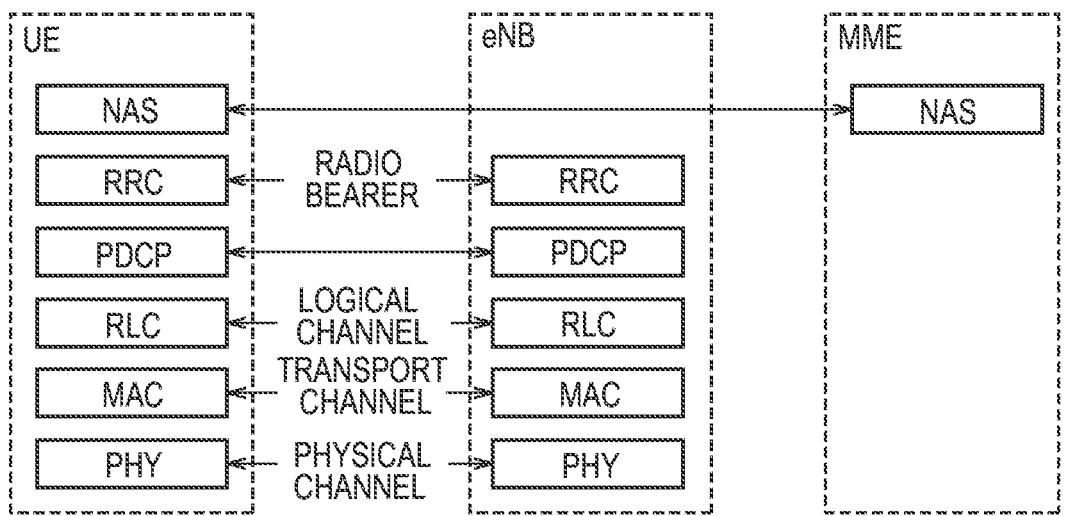
FIG. 4 is a protocol stack diagram of a radio interface in the LTE system.

FIG. 4 is a protocol stack diagram of a radio interface in the LTE system. As illustrated in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The physical layer performs encoding and decoding, modulation and demodulation, antenna mapping and demapping, and resource mapping and demapping. Between the physical layer of the UE 1 and the physical layer of the eNB 2, data is transmitted via a physical channel.

The MAC layer performs priority control of data, and a retransmission process and the like by hybrid ARQ (HARQ). Between the MAC layer of the UE 1 and the MAC layer of the eNB 2, data is transmitted via a transport channel. The MAC layer of the eNB 2 includes a transport format of an uplink and a downlink (a transport block size and a modulation and coding scheme (MCS)) and a scheduler for determining a resource block to be assigned.

The RLC layer transmits data to an RLC layer of a reception side by using the functions of the MAC layer and the physical layer. Between the RLC layer of the UE 1 and the RLC layer of the eNB 2, data is transmitted via a logical channel.

The PDCP layer performs header compression and decompression, and encryption and decryption.

The RRC layer is defined only in a control plane. Between the RRC layer of the UE 1 and the RRC layer of the eNB 2, a control (an RRC) for various types of setting is transmitted. The RRC layer controls the logical channel, the transport channel, and the physical channel in response to establishment, re-establishment, and release of a radio bearer. When there is an RRC connection between the RRC of the UE 1 and the RRC of the eNB 2, the UE 1 is in a connected state (an RRC connected state), and when there is no RRC connection, the UE 1 is in an idle state (an RRC idle state).

A NAS (Non-Access Stratum) layer positioned above the RRC layer performs session management, mobility management and the like.

Figure 5:
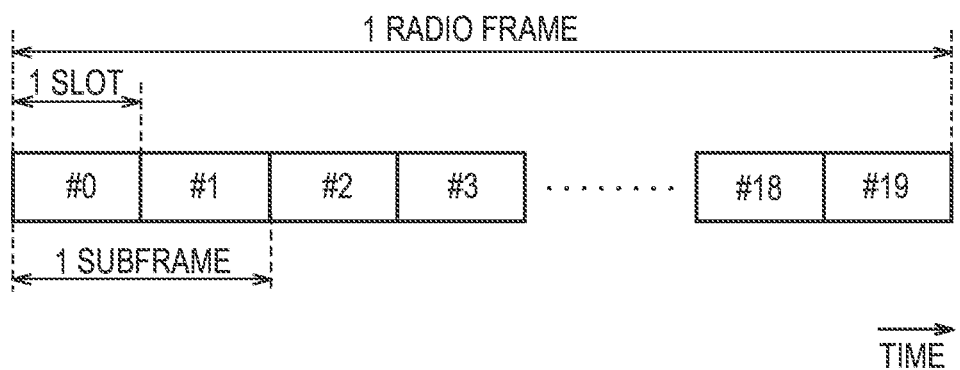
FIG. 5 is a configuration diagram of a radio frame used in the LTE system.

FIG. 5 is a configuration diagram of a radio frame used in the LTE system. The frequency division multiplexing scheme is applied to the LTE system. Specifically, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. The resource block includes a plurality of subcarriers in the frequency direction. Among radio resources assigned to the UE 1, a frequency resource can be designated by a resource block and a time resource can be specified by a subframe (or slot).

In the downlink, an interval of several symbols at the head of each subframe is a control region used as a physical downlink control channel (PDCCH) for mainly transmitting a control signal. Furthermore, the other interval of each subframe is a region available as a physical downlink shared channel (PDSCH) for mainly transmitting user data.

In the uplink, both ends in the frequency direction of each subframe are control regions used as a physical uplink control channel (PUCCH) for mainly transmitting a control signal. Furthermore, the central portion in the frequency direction of each subframe is a region available as a physical uplink shared channel (PUSCH) for mainly transmitting user data.

(Operation According to First Embodiment)

Next, an operation according to the first embodiment will be described. The LIE system according to the first embodiment supports D2D communication that is direct UE-to-UE communication. Hereinafter, the D2D communication will be described in comparison with normal communication (cellular communication) of the LTE system.

In the cellular communication, a data path passes through the EPC 20 that is the core network. The data path indicates a communication path of user data (a user plane). On the other hand, in the D2D communication, the data path set between UEs does not pass through the EPC 20. Thus, it is possible to reduce traffic load of the EPC 20.

The UE 1 discovers another UE 1 that exists in the vicinity of the UE 1, and starts the D2D communication. The D2D communication includes a direct communication mode and a locally routed mode.

Figure 6:
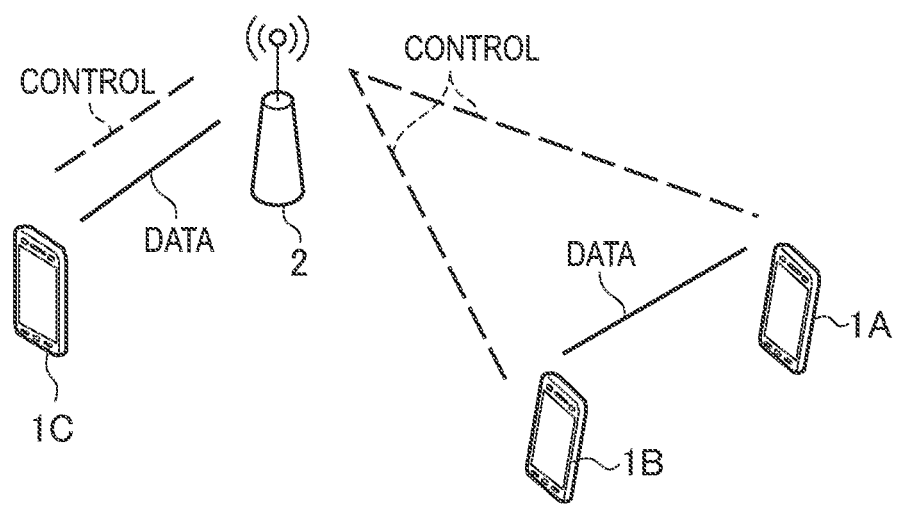
FIG. 6 is a diagram illustrating a direct communication mode in D2D communication.

FIG. 6 is a diagram illustrating the direct communication mode in the D2D communication. As illustrated in FIG. 6, in the direct communication mode, a data path does not pass through the eNB 2. UE 1A and UE 1B adjacent to each other directly perform radio communication with low transmission power in a cell of the eNB 2. Thus, a merit including reduction of power consumption of the UE 1 and decrease of interference to a neighboring cell can be obtained.

The UE 1A and UE 1B are D2D UEs (D2D terminals) that perform the D2D communication in the direct communication mode in the cell of the eNB 2. The UE 1A and UE 1B in a connected state perform the D2D communication by using a radio resource that is assigned by the eNB 2. The UE 1A and UE 1B transmit and receive user data to and from each other, and transmit and receive a control signal to and from the eNB 2. As described above, the control of the D2D communication is performed at the initiative of the eNB 2.

UE 1C is a cellular UE (a cellular terminal) that performs cellular communication in the cell of the eNB 2. The UE 1C in a connected state performs the cellular communication by using the radio resource that is assigned by the eNB 2. The UE 1C transmits and receives user data and a control signal to and from the eNB 2.

In addition, in the locally routed mode, a data path between UEs passes through the eNB 2, however, the data path does not pass through the EPC 20. That is, in the locally routed mode, the UE 1A and UE 1B perform radio communication via the eNB 2 without passing through the EPC 20. The locally routed mode is able to reduce traffic load of the EPC 20, however, has a smaller merit as compared with the direct communication mode. Thus, in the first embodiment, the direct communication mode is mainly assumed.

Further, in the first embodiment, a case, in which the D2D communication is performed in a frequency band (a licensed band) of the LTE system, is assumed.

Figure 7:
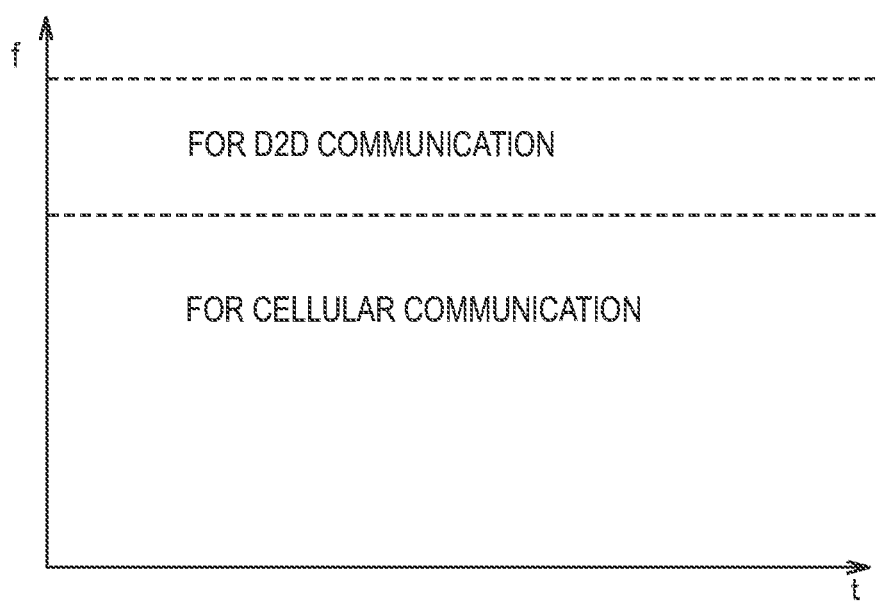
FIG. 7 is a diagram illustrating a frequency assignment according to a first embodiment.

FIG. 7 is a diagram illustrating a frequency assignment according to the first embodiment. As illustrated in FIG. 7, the frequency band of the LIE system is divided into a frequency band for cellular communication and a frequency band for D2D communication. Such frequency assignment enables to avoid interference between the cellular communication and the D2D communication.

Further, in the first embodiment, the frequency division multiplexing scheme is applied to the cellular communication and the code division multiplexing scheme is applied to the D2D communication. Namely, for a cellular UE, a different frequency resource (a resource block) is assigned, thereby realizing multiplexing. For a D2D UE, a different spread code (a code) is assigned, thereby realizing multiplexing.

Figure 8:
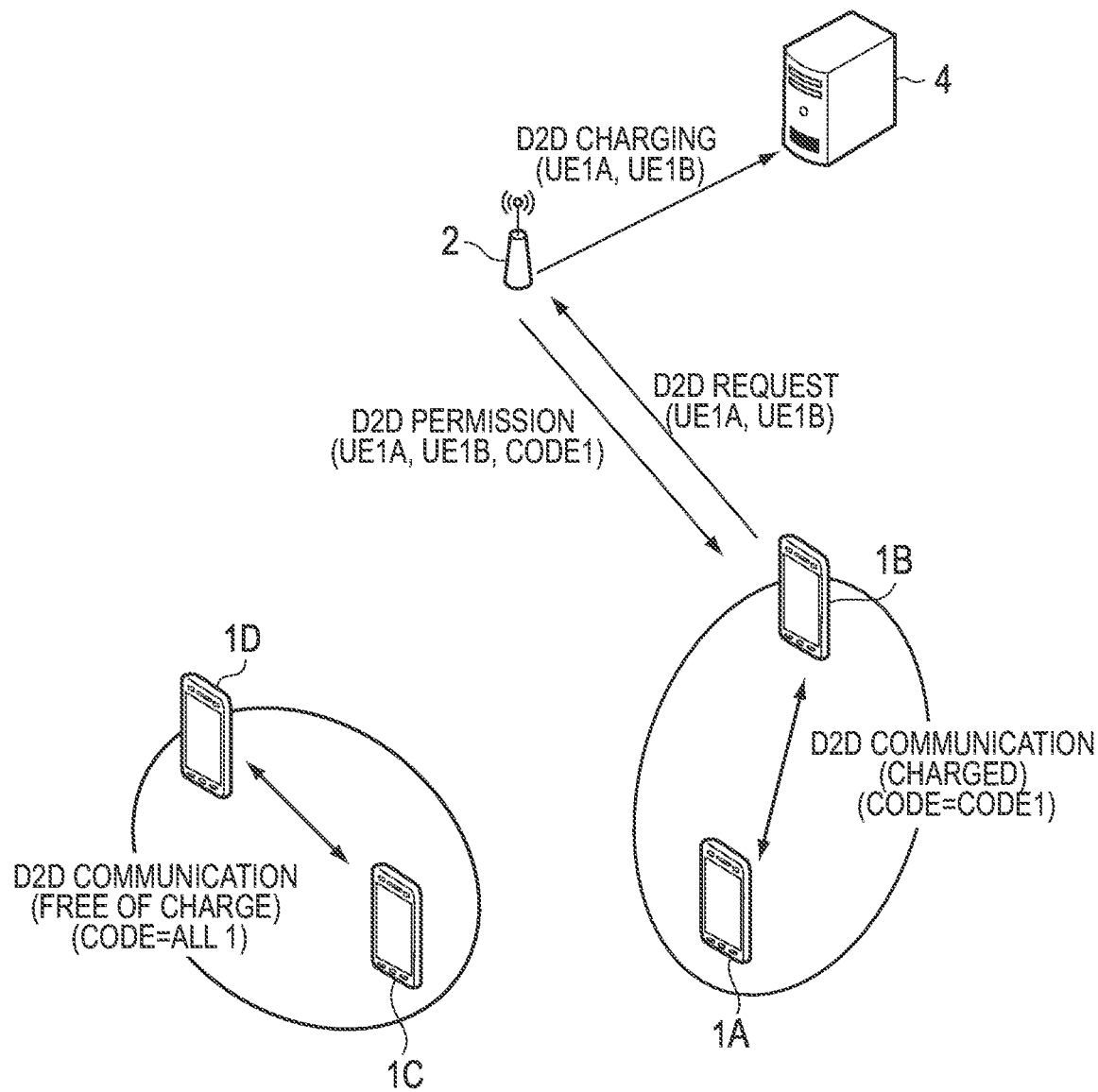
FIG. 8 is a diagram illustrating an operation environment according to the first embodiment.

FIG. 8 is a diagram illustrating an operation environment according to the first embodiment. As illustrated in FIG. 8, a plurality of UE 1A to UE 1D camp on the cell of the eNB 2. Each of the plurality of UE 1A to UE 1D retains the initial spread code having no orthogonality (for example, all 1).

The UE 1B discovers the UE 1A by the discovery process of discovering a neighboring UE that should be a communication partner in D2D communication, and starts the D2D communication with the UE 1A. The UE 1A and UE 1B performs the D2D communication (guaranteed D2D communication) by using the spread code assigned by the eNB 2. The guaranteed D2D communication is to be charged by the charging server 4. The spread code assigned by the eNB 2 has orthogonality, and thus, excellent communication quality and high confidentiality are guaranteed in the guaranteed D2D communication.

The UE 1D discovers the UE 1C by the discovery process and starts D2D communication with the UE 1C. The UE 1C and UE 1D perform the D2D communication (non-guaranteed D2D communication) by using the initial spread code. The non-guaranteed D2D communication is not to be charged by the charging server 4, that is, the communication is free of charge. The non-guaranteed D2D communication is available for free, but communication quality and confidentiality are not guaranteed.

Figure 9:
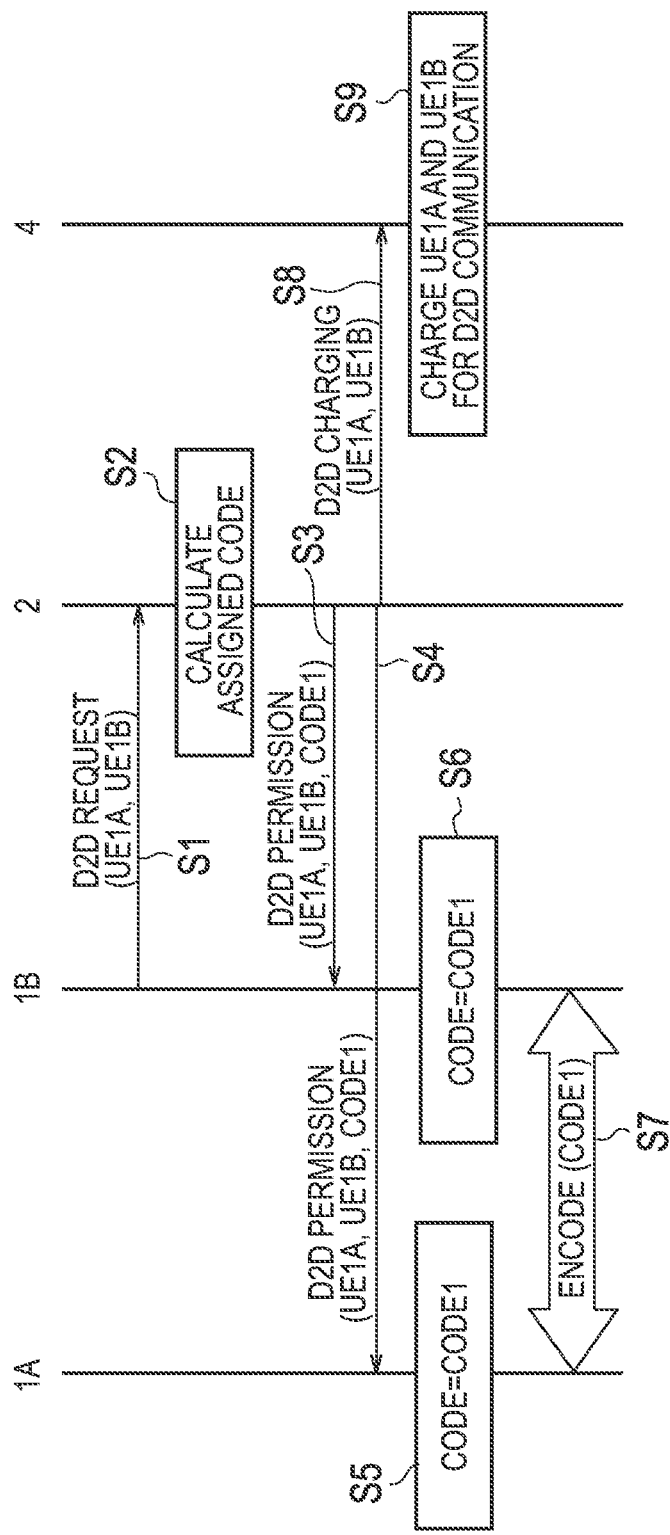
FIG. 9 is a sequence diagram according to the first embodiment.

FIG. 9 is a sequence diagram according to the first embodiment. Hereinafter, an operation to start the D2D communication of the UE 1A and UE 1B after completing the discovery process will be described.

As illustrated in FIG. 9, firstly, the UE 1B in a connection state in the cell of the eNB 2 transmits, to the eNB 2, a D2D request to request assignment for the D2D communication (S1). The D2D request includes an identifier of each of the UEs 1 (the UE 1A and UE 1B) that requests the assignment. It is noted that, in the description of the drawings below, the identifiers of the UE 1A, the UE 1B, . . . is denoted as "UE 1A", "UE 1B", . . . , appropriately.

Secondly, the eNB 2 that has received the D2D request calculates a spread code having orthogonality in response to the D2D request (S2). For example, a Walsh code may be used as the spread code having orthogonality. When the eNB 2 realizes the spread code being assigned in the neighboring eNB (which will be described later in a seventh embodiment), it is preferable that the eNB 2 calculates a spread code that does not overlap with the spread code being assigned in the neighboring eNB.

Thirdly, the eNB 2 transmits D2D permission to permit the D2D communication, to the UE 1A and UE 1B (S3, S4). The D2D permission includes code information indicating the calculated spread code (assigned spread code) and an identifier of each of the UEs 1 (the UE 1A and UE 1B) that are permitted to perform the D2D communication. As a result, the spread code is assigned to the UE 1A and UE 1B.

Fourthly, the eNB 2 that has assigned the spread code to the UE 1A and UE 1B transmits, to the charging server 4, D2D charging information to charge for the use of the spread code by the UE 1A and UE 1B (S8). The D2D charging information includes the identifier of each of the UEs 1 (the UE 1A and UE 1B) that are to be charged. The charging server 4 charges each of the UEs 1 (the UE 1A and UE 1B) corresponding to the identifier included in the D2D charging (S9).

Fifthly, the UE 1A and UE 1B, which have received the D2D permission from the eNB 2, set the spread code corresponding to the code information included in the D2D permission (code1 in this case) (S5, S6). Then, the UE 1A and UE 1B perform the D2D communication by using the set spread code (S7).

As described above, in the first embodiment, excellent communication quality and high confidentiality are guaranteed for the UE 1A and UE 1B that perform the guaranteed D2D communication on condition of the charging. Further, the network (the eNB 2 and the charging server 4) can appropriately operate the charging of the D2D communication by charging for the use of the spread code. Further, though communication quality and confidentiality are not guaranteed for the UE 1C and UE 1D that perform the non-guaranteed D2D communication, the UE 1C and UE 1D can perform the D2D communication.

[First Modification of First Embodiment]

Any one of the UE 1A and UE 1B may be UE (hereinafter, an anchor UE) capable of controlling the other UE in the D2D communication. When the anchor UE exists, the other UE (the communication partner UE) can transmit and receive the control signal to and from not the eNB 2 but the anchor UE.

Figure 10:
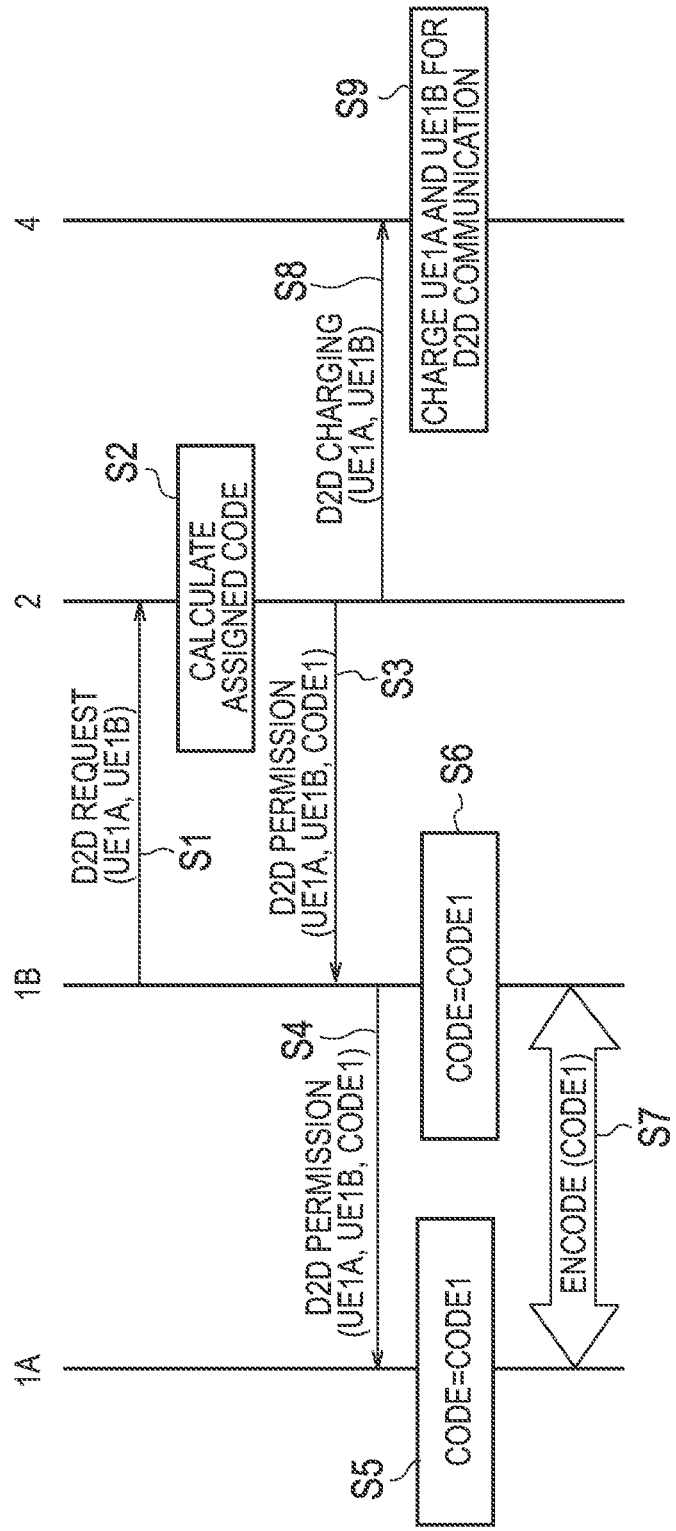
FIG. 10 is a sequence diagram according to a first modification of the first embodiment.

FIG. 10 is a sequence diagram according to a first modification of the first embodiment. Hereinafter, a case where the UE 1B is the anchor UE will be described.

As illustrated in FIG. 10, the eNB 2 transmits the D2D permission only to the UE 1B (S3). That is, the eNB 2 notifies only the UE 1B of the assigned spread code.

The UE 1B that has received the D2D permission transfers the D2D permission to the UE 1A (S4). As a result, the assigned spread code is notified to the UE 1A.

As described above, in the first modification of first embodiment, signaling between the eNB and UE can be reduced by notifying the UE 1A of the assigned spread code via the UE 1B.

[Second Modification of First Embodiment]

The UE 1A and UE 1B camp not only on the identical cell, but may also camp on different cells.

Figure 11:
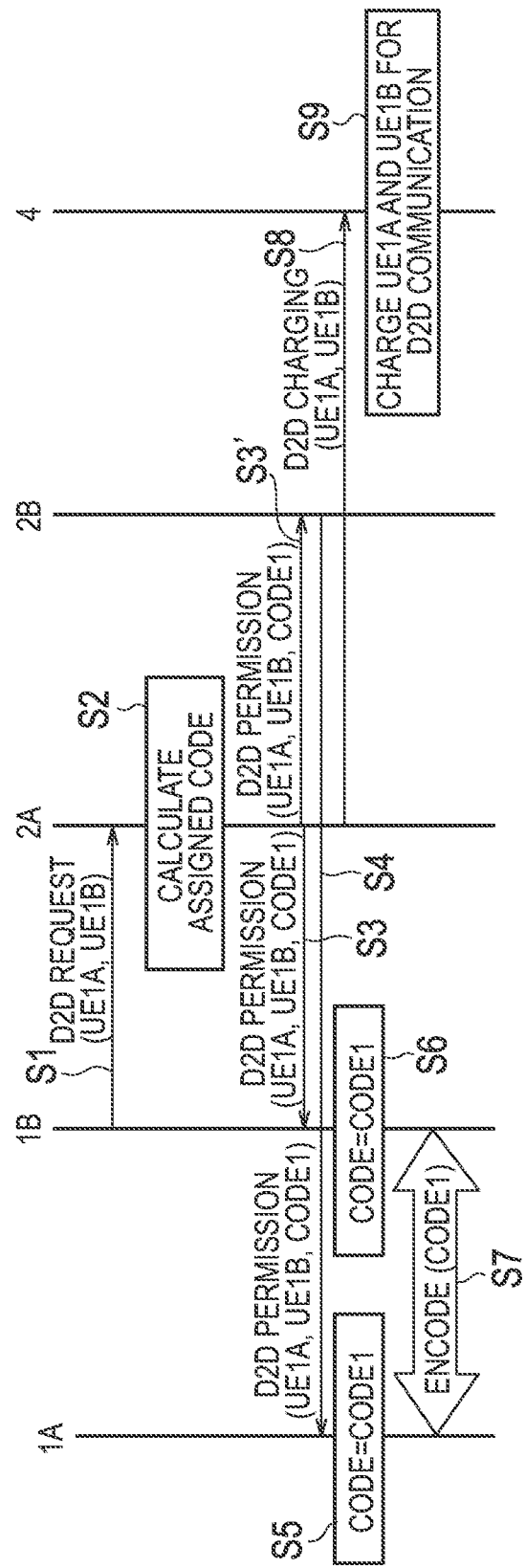
FIG. 11 is a sequence diagram according to a second modification of the first embodiment.

FIG. 11 is a sequence diagram according to a second modification of the first embodiment. Hereinafter, a case where the UE 1B camps on the cell of eNB 2A and the UE 1A camps on the cell of eNB 2B will be described.

As illustrated in FIG. 11, the eNB 2A that has calculated the spread code (S2) transmits D2D permission to the UE 1B (S3) and transmits D2D permission to the eNB 2B (S3').

The eNB 2B that has received the D2D permission from the eNB 2A transfers the D2D permission to the UE 1A (S4). Thus, the assigned spread code is notified by the eNB 2A to the UE 1A via the eNB 2B.

As described above, in the second modification of first embodiment, the UE 1A and UE 1B can perform the D2D communication even when the UE 1A and UE 1B camp on different cells.

Figure 12:
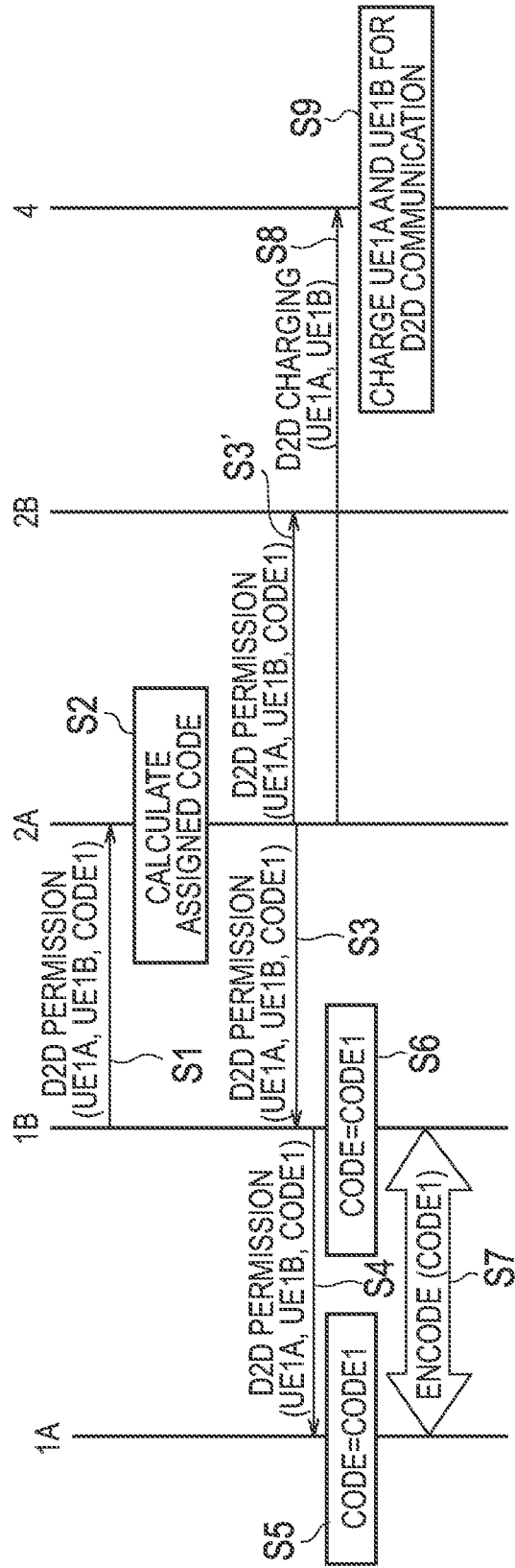
FIG. 12 is a sequence diagram in which a part of the sequence of FIG. 11 is changed.

FIG. 12 is a sequence diagram obtained by changing a part of the sequence of FIG. 11. As illustrated in FIG. 12, when the UE 1A and UE 1B camp on different cells, the UE 1B operates as an anchor UE. The UE 1B that has received the D2D permission from the eNB 2A transfers the D2D permission to the UE 1A (S4).

[Third Modification of First Embodiment]

Figure 13:
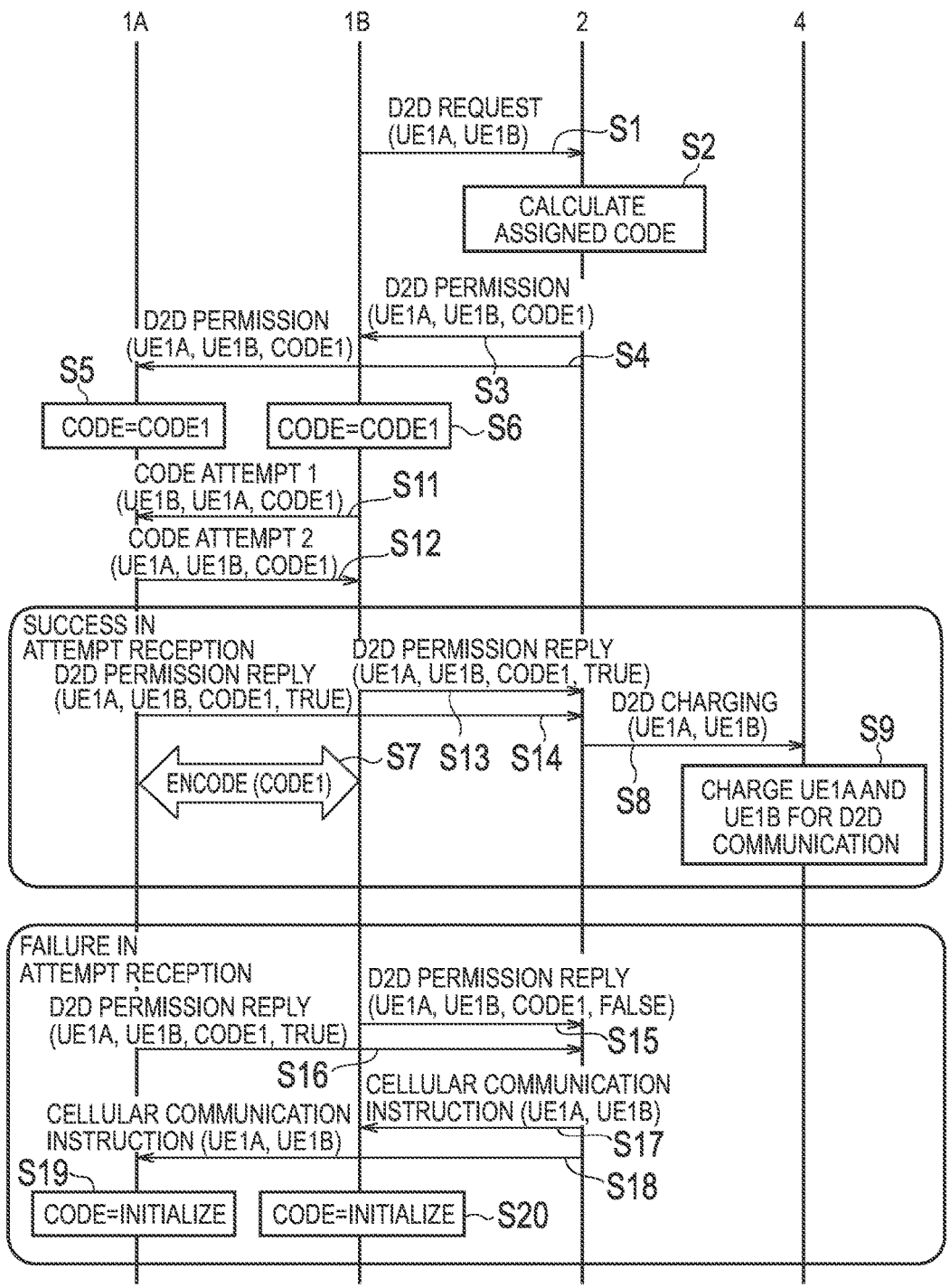
FIG. 13 is a sequence diagram according to a third modification of the first embodiment.

In a third modification of the first embodiment, the UE 1A and UE 1B use the assigned spread code after attempt of use. FIG. 13 is a sequence diagram according to the third modification of the first embodiment.

As illustrated in FIG. 13, after setting the spread code (S5, S6), the UE 1A and UE 1B attempt the D2D communication by using the spread code (S11, S12).

When the attempt is successful, the UE 1A and UE 1B transmit, to the eNB 2, a D2D permission reply indicating the success in the attempt (S13, S14) and start the D2D communication (S7).

When the eNB 2 receives the D2D permission reply indicating the success in the attempt, the eNB 2 transmits the D2D charging information to the charging server 4 (S8). The charging server 4 that has received the D2D charging information charges the UE 1A and UE 1B (S9).

On the other hand, when the UE 1B detects failure in the attempt, the UE 1B transmits, to the eNB 2, the D2D permission reply indicating the failure in the attempt (S15). The UE 1A detects success in the attempt and transmits, to the eNB 2, the D2D permission reply indicating the success in the attempt (S16). The eNB 2 that has received, from the UE 1B, the D2D permission reply indicating the failure in the attempt instructs the UE 1A and UE 1B to perform cellular communication (S17, S18). The UE 1A and UE 1B that have received the cellular communication instruction initialize the set spread code (S19, S20) and shift to the cellular communication.

As described above, in the third modification of first embodiment, continuity in communication can be guaranteed by switching to the cellular communication when the attempt of the assigned spread code fails. The UE 1A and UE 1B are not charged when the attempt of the assigned spread code by the UE 1A and UE 1B is not successful, and thus, it is possible to prevent being charged despite the D2D communication not being able to be performed.

[Fourth Modification of First Embodiment]

In a fourth modification of the first embodiment, the multicarrier code division multiplexing scheme is applied to D2D communication. FIG. 14 is a diagram illustrating a data transmission method according to the fourth modification of the first embodiment.

As illustrated in FIG. 14, the UE 1 performing the D2D communication performs transmission by applying the spread code to each of a plurality of subcarriers. Specifically, the transmission data is S/P (Serial/Parallel) converted in accordance with a plurality of subcarriers included in a transmission and reception frequency band of the D2D communication, and the transmission data for each subcarrier is encoded (spread) by the spread code and transmitted. FIG. 14(A) illustrates a case where timing offset of data D between the subcarriers occurs, and FIG. 14(B) illustrates a case where no timing offset of data D between the subcarriers occurs.

As described above, in the fourth modification of the first embodiment, the communication speed of the D2D communication can be improved by transmitting data in parallel in the plurality of subcarriers.

[Fifth Modification of First Embodiment]

In a fifth modification of the first embodiment, the eNB 2 designates transmission and reception start timing (encoding start point) of D2D communication.

The eNB 2 broadcasts information indicating the encoding start point by using, as a reference, timing of cellular communication. The encoding start point means timing at which encoding by applying one spread code starts. For example, each data Dx illustrated in FIG. 14 corresponds to a period of several subframes, and thus, it is necessary to designate the encoding start point, that is a start point (start timing) of the period.

For example, the eNB 2 instructs the encoding start point by broadcast information such as a system information block (SIB) or a master information block (MIB). As the designation of the encoding start point, for example, the following $T_{STEP}$ and $T_{OFFSET}$ are designated in the broadcast information.

$$T_{OFFSET} = (SFN \times 10 + \text{subframe}) \bmod T_{STEP}$$

In this case, SFN represents a radio frame number and subframe represents a subframe number. On the basis of $T_{STEP}$ and $T_{OFFSET}$, the UE 1 performing the D2D communication specifies the encoding start point by using the above-described calculation formula.

Further, transmission in the D2D communication is performed, in a cell, either at a timing synchronized with a reception timing of downlink of the cellular communication or at a timing synchronized with a timing corrected in Timing Advance (TA). The synchronization in this case is synchronization in one subframe unit.

[Sixth Modification of First Embodiment]

In a sixth modification of the first embodiment, when the UE 1 performing D2D communication transmits data, the UE 1 transmits information indicating an application corresponding to the data (application information) by adding the information to the data.

Figure 15:
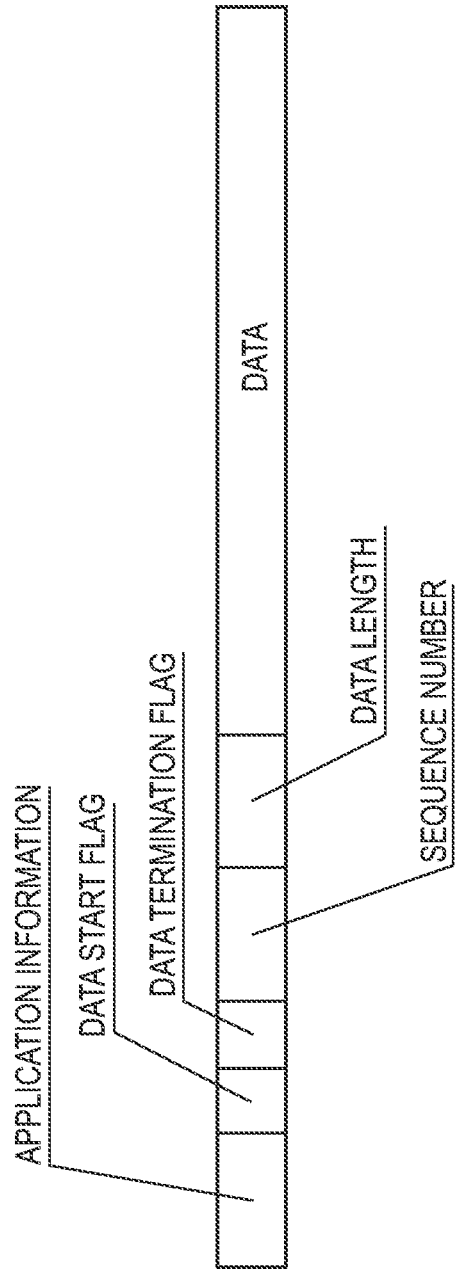
FIG. 15 is a diagram illustrating a transmission data format according to a sixth modification of the first embodiment.

FIG. 15 is a diagram illustrating a transmission data format according to the sixth modification of the first embodiment. As illustrated in FIG. 15, in addition to a field where data is stored, the format has fields for application information, a data start flag, a data termination flag, a sequence number, and a data length. The application information may be an identifier indicating an application, an application type, QoS that is requested for the application, bearer identification information or the like.

As described above, in the sixth modification of the first embodiment, by adding the application information to the transmission data in the D2D communication, it is possible for the reception side to determine which application the reception data is for. Therefore, when the data is received, it is possible to decrypt the data. As a result, it is possible to start communication without a connection procedure between the UEs that perform the D2D communication.

[Seventh Modification of First Embodiment]

In a seventh modification of the first embodiment, the UE 1 (UE 1C and UE 1D in FIG. 8) performing the D2D communication by using the initial spread code performs transmission in the D2D communication, on the basis of the result of monitoring an interference wave signal (that is, carrier sense).

Figure 16:
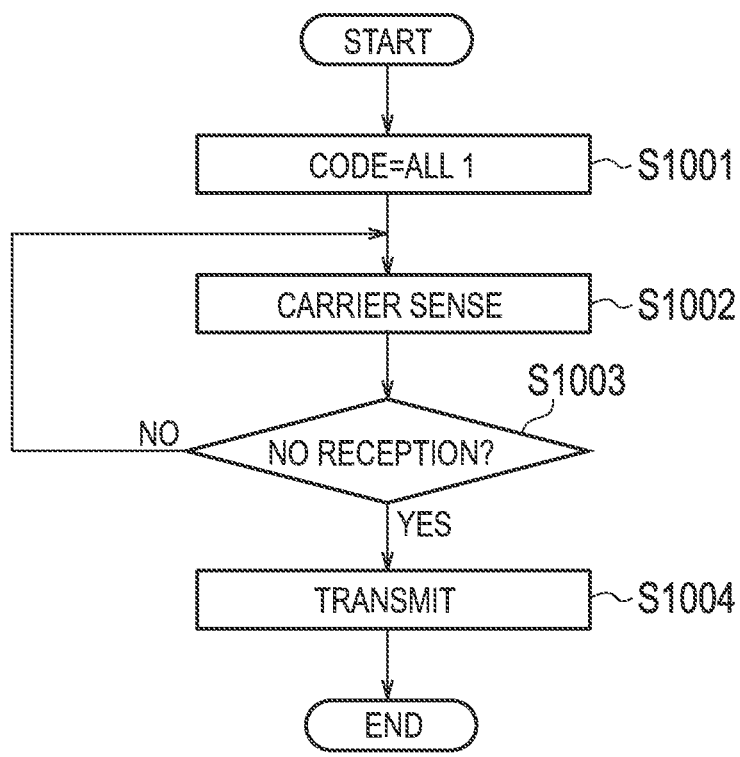
FIG. 16 is a flow diagram according to a seventh modification of the first embodiment.

FIG. 16 is a flow diagram according to the seventh modification of the first embodiment. As illustrated in FIG. 16, the UE 1 sets the initial spread code (S1001), and upon performing the D2D communication, performs carrier sense (S1002). In this case, it is confirmed whether or not the interference wave signal is received in the transmission and reception frequency band of the D2D communication (S1003). The UE 1 performs transmission, after the UE 1 confirms that no interference wave signal is received (S1004).

As described above, in the seventh modification of the first embodiment, the interference occurring in the non-guaranteed D2D communication can be reduced by performing carrier sense.

[Eighth Modification of First Embodiment]

In an eighth modification of the first embodiment, the UE 1 (UE 1C and UE 1D in FIG. 8) performing the D2D communication by using the initial spread code requests the eNB 2 to assign a spread code in response to detection of deterioration in communication quality of the D2D communication.

Figure 17:
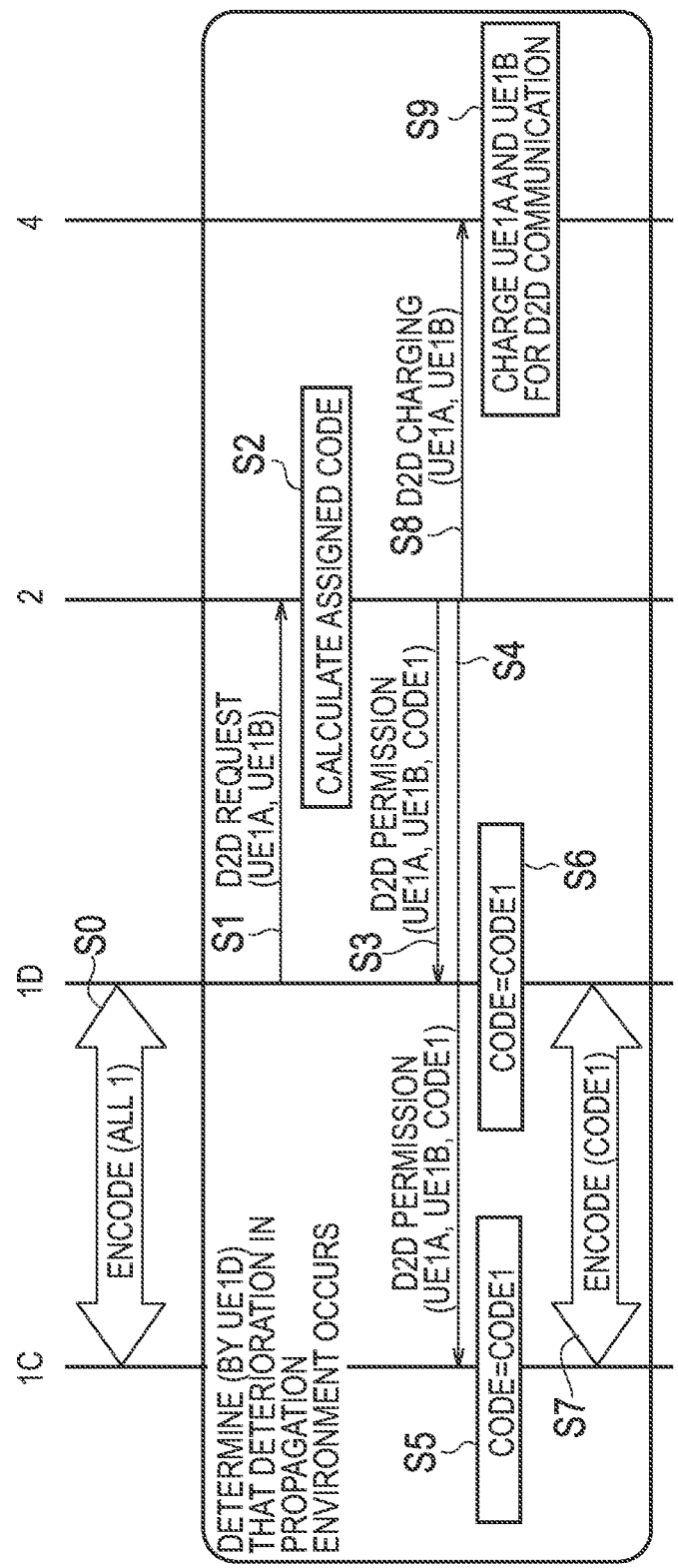
FIG. 17 is a sequence diagram according to an eighth modification of the first embodiment.

FIG. 17 is a sequence diagram according to the eighth modification of the first embodiment. As illustrated in FIG. 17, during the D2D communication by using the initial spread code (S0), when the UE 1D detects deterioration in communication quality of the D2D communication, the UE 1D requests the eNB 2 to assign the spread code (S1). As a result, the non-guaranteed D2D communication is switched to the guaranteed D2D communication.

For example, the UE 1D detects the deterioration in communication quality of the D2D communication on the basis of information (error level information) such as channel information, interference power, a path loss, or the (mean) number of times of retransmissions. The error level information can be calculated on the basis of a reference signal having known transmission power and timing, which is transmitted and received in the D2D communication.

As described above, in the eighth modification of the first embodiment, even when the communication quality of the non-guaranteed D2D communication deteriorates, it is possible to continue the D2D communication by the guaranteed D2D communication.

Figure 18:
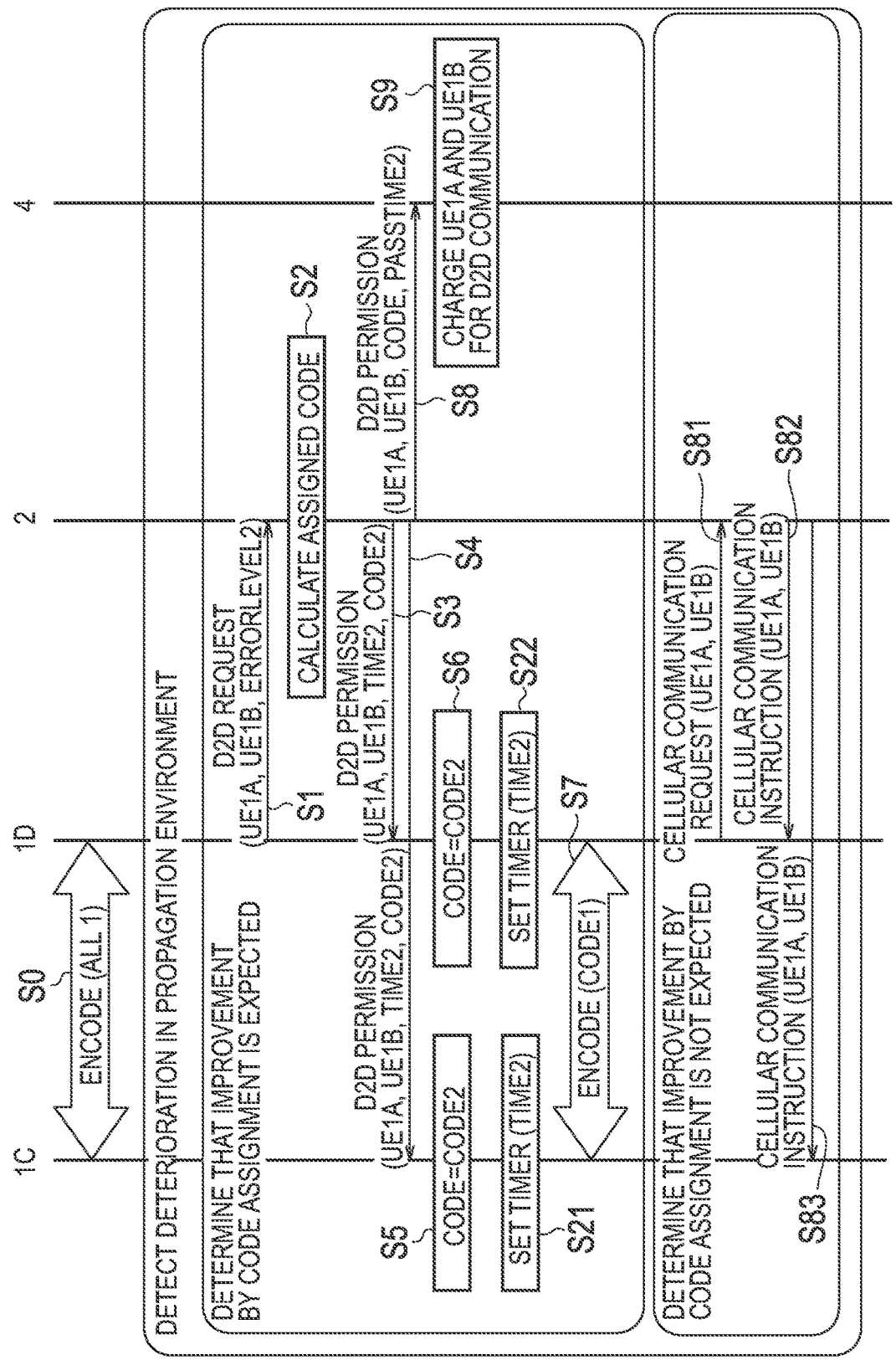
FIG. 18 is a sequence diagram in which a part of the sequence of FIG. 17 is changed.

FIG. 18 is a sequence diagram obtained by changing a part of the sequence of FIG. 17. As illustrated in FIG. 18, when detecting deterioration in communication quality of the D2D communication and when determining that the communication quality will improve by assigning the spread code, the UE 1D requests the eNB 2 to assign the spread code (S1). For example, when the received power of a reference signal from the UE 1C is sufficient (that is, the path loss is small), while the interference power is high (or retransmission occurs frequently), the UE 1D determines that the communication quality will improve by assigning the spread code.

On the other hand, for example, when the received power of a reference signal from the UE 1C is low (that is, the path loss is large), the UE 1D determines that improvement in the communication quality by assigning the spread code is not expected. In this case, the UE 1D requests the cellular communication to the eNB 2 (S81), and the eNB 2 causes the UE 1C and UE 1D to start the cellular communication (S82, S83).

Second Embodiment

Next, a second embodiment will be described regarding a difference from the first embodiment. The second embodiment is different from the first embodiment in that a valid time is set for the spread code assigned by the eNB 2. The UE 1 to which the spread code is assigned by the eNB 2 requests the eNB 2 to reassign the spread code in order to continue the D2D communication.

Figure 19:
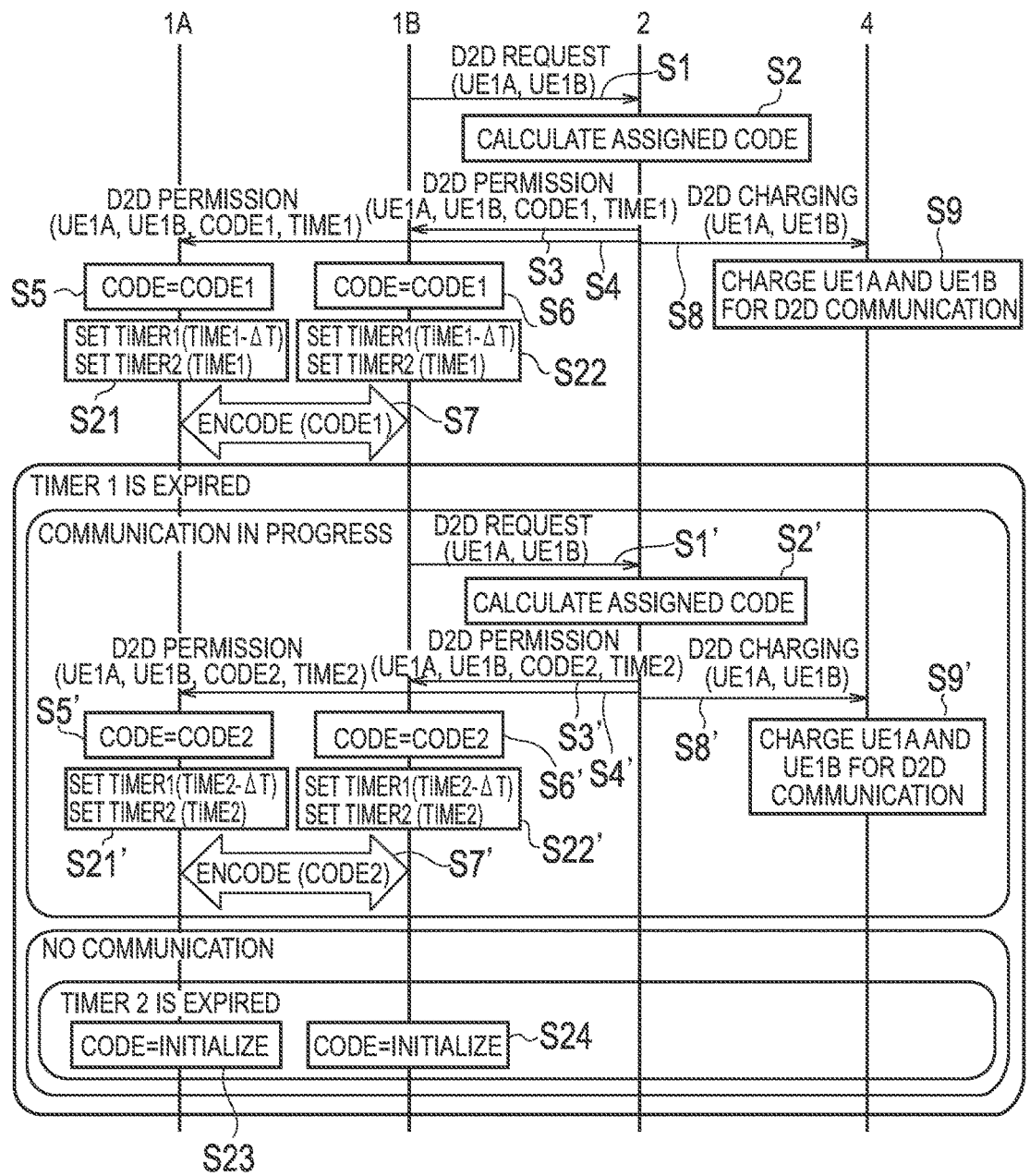
FIG. 19 is a sequence diagram according to a second embodiment.

FIG. 19 is a sequence diagram according to the second embodiment. As illustrated in FIG. 19, the eNB 2 further includes valid time information indicating the valid time of the assigned spread code in the D2D permission, and then transmits the D2D permission (S3, S4). The UE 1A and UE 1B, which have received the D2D permission, set the spread code indicated by the code information included in the D2D permission (S5, S6).

Further, the UE 1A and UE 1B set two types of timers (a timer 1 and a timer 2) on the basis of the valid time information included in the D2D permission (S21, S22). For the timer 1, a time obtained by subtracting a predetermined time (Δt) from the valid time indicated by the valid time information is set. That is, the timer 1 is set so as to expire before the original valid time expires. Preferably, the predetermined time (Δt) is a time equal to or longer than a time required for the procedure of reassigning a spread code. For the timer 2, the valid time indicated by the valid time information is set.

The UE 1A and UE 1B perform the D2D communication by using the set spread code (S7).

When the UE 1A and UE 1B continue the D2D communication at a point of time when the timer 1 expires, the UE 1A and UE 1B start the procedure of reassigning a spread code. The UE 1B transmits, to the eNB 2, a D2D request indicating a request for the reassignment of a spread code (S1').

The eNB 2 that has received the D2D request calculates a new spread code having orthogonality in response to the D2D request (S2'). The eNB 2 assigns the new spread code to the UE 1A and UE 1B (S3', S4'). A valid time is also set for the new spread code.

The UE 1A and UE 1B set the new spread code (S5', S6'), and set two types of timers (timer 1, timer 2) (S21', S22'). The UE 1A and UE 1B continue the D2D communication by using the set spread code (S7').

The eNB 2 that has assigned the new spread code to the UE 1A and UE 1B transmits, to the charging server 4, the charging information (S8'). The charging server 4 additionally charges the UE 1A and UE 1B (S9').

On the other hand, when the UE 1A and UE 1B end the D2D communication at a point of time when the timer 2 expires, the UE 1A and UE 1B initialize the set spread code (S23, S24).

As described above, in the second embodiment, the valid time is set for the spread code for the D2D communication and charging is performed each time the spread code is reassigned, and thus, it is possible to charge in accordance with the D2D communication time. Therefore, it is possible to set higher charge as the D2D communication time becomes longer.

[First Modification of Second Embodiment]

In a first modification of the second embodiment, when reassigning the spread code, the eNB 2 assigns a spread code different from the spread code before the reassignment (the previous code).

Figure 20:
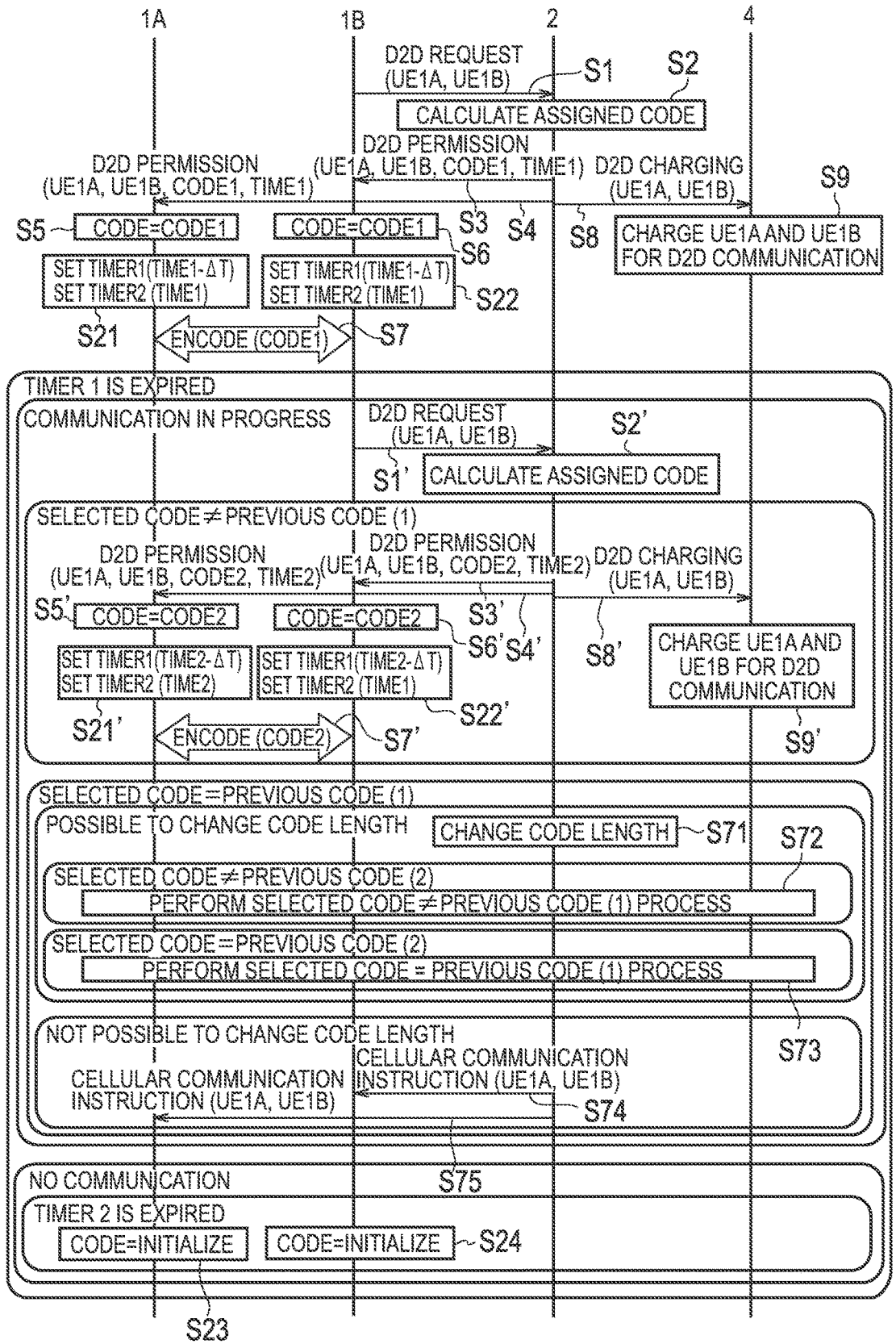
FIG. 20 is a sequence diagram according to a first modification of the second embodiment.

FIG. 20 is a sequence diagram according to the first modification of the second embodiment. As illustrated in FIG. 20, in the procedure of reassigning a spread code, operations when the new spread code (selected code) calculated by the eNB 2 (S2') is different from the previous code are similar to those in the above-mentioned second embodiment.

On the other hand, for example, when all spread codes having the same code length as that of the previous code have been assigned, the selected code becomes the same code as the previous code, and thus, it is not possible to assign a spread code different from the previous spread code. In this case, the eNB 2 changes the code length of the spread code (S71).

Operations when the spread code (selected code) is different from the previous code after the code length is changed are similar to those in the above-mentioned second embodiment (S72). In contrast, when the spread code (selected code) is the same as the previous code after the code length is changed, the code length is changed again (S73).

However, in a case where the code length of the spread code cannot be changed, the eNB 2 instructs the UE 1A and UE 1B to perform switching to cellular communication (S74, S75). In this case, the case where the code length of the spread code cannot be changed is a case where all spread codes have been assigned or a case where a requested band (requested data rate) cannot be satisfied due to the elongation of the code length. It is noted that the latter case will be described in a third modification of the fifth embodiment.

As described above, in the first modification of the second embodiment, by assigning a spread code different from the spread code before the reassignment (the previous code), it is possible to ensure confidentiality in the D2D communication.

[Second Modification of Second Embodiment]

Figure 21:
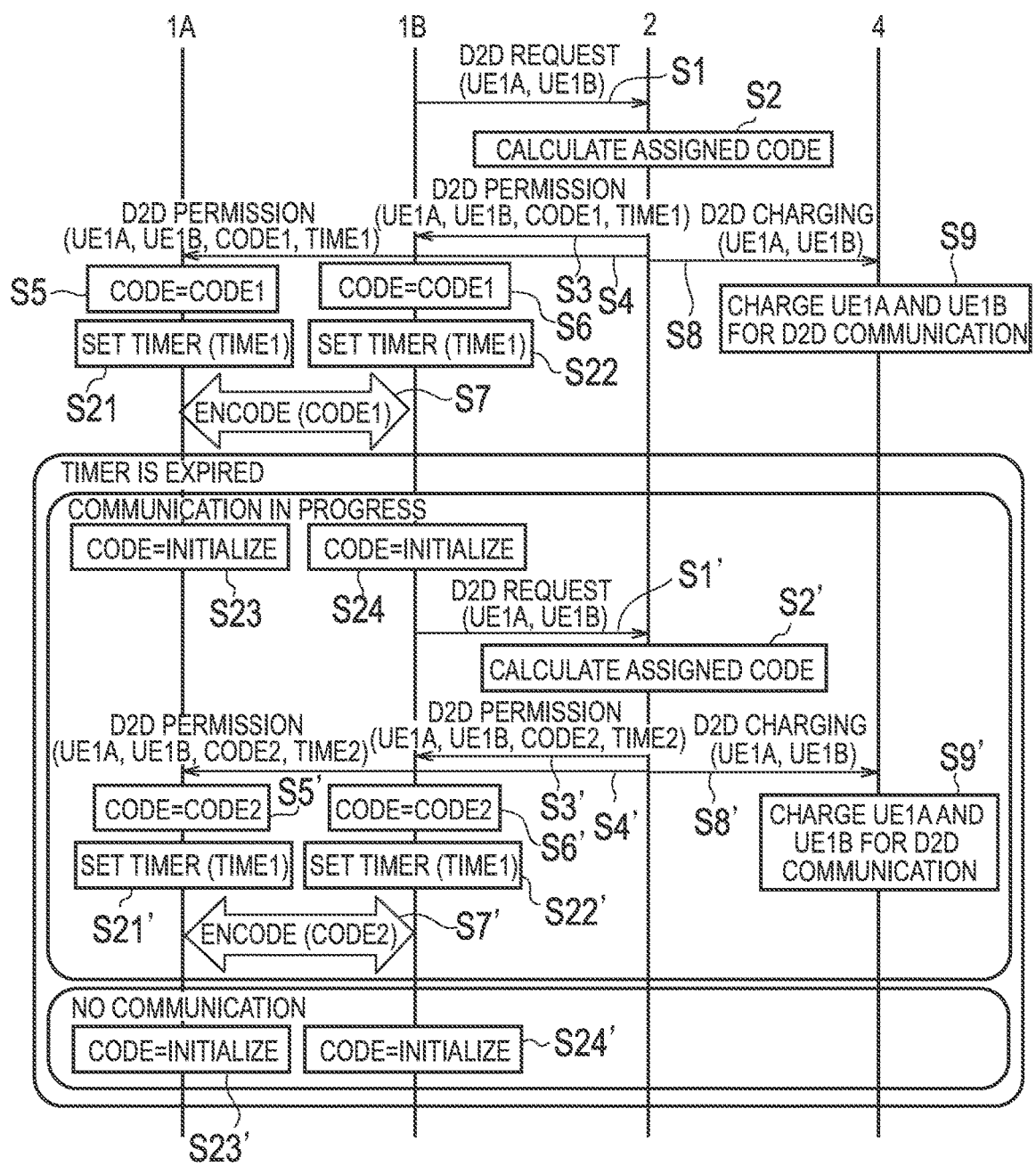
FIG. 21 is a sequence diagram according to a second modification of the second embodiment.

In a second modification of the second embodiment, only a single type of timers is used. FIG. 21 is a sequence diagram according to the second modification of the second embodiment.

As illustrated in FIG. 21, the UE 1A and UE 1B set only a single type of timers corresponding to the valid time of the spread code (S21, S22). When the UE 1A and UE 1B continue the D2D communication at a point of time when the timer expires, the UE 1A and UE 1B initialize the spread code (S23, S24) and start the procedure of reassigning a spread code. The UE 1A and UE 1B perform non-guaranteed D2D communication by using the initial spread code or stop the data communication from the expiry of timer until reassignment of a spread code.

On the other hand, when the UE 1A and UE 1B end the D2D communication at a point of time when the timer expires, the UE 1A and UE 1B initialize the spread code without starting the procedure of reassigning a spread code (S23', S24').

As described above, in the second modification of the second embodiment, when the timer expires, the non-guaranteed D2D communication is temporarily performed or the communication is stopped. However, simple management of the timer in the UE 1A and UE 1B can be achieved.

[Third Modification of Second Embodiment]

Figure 22:
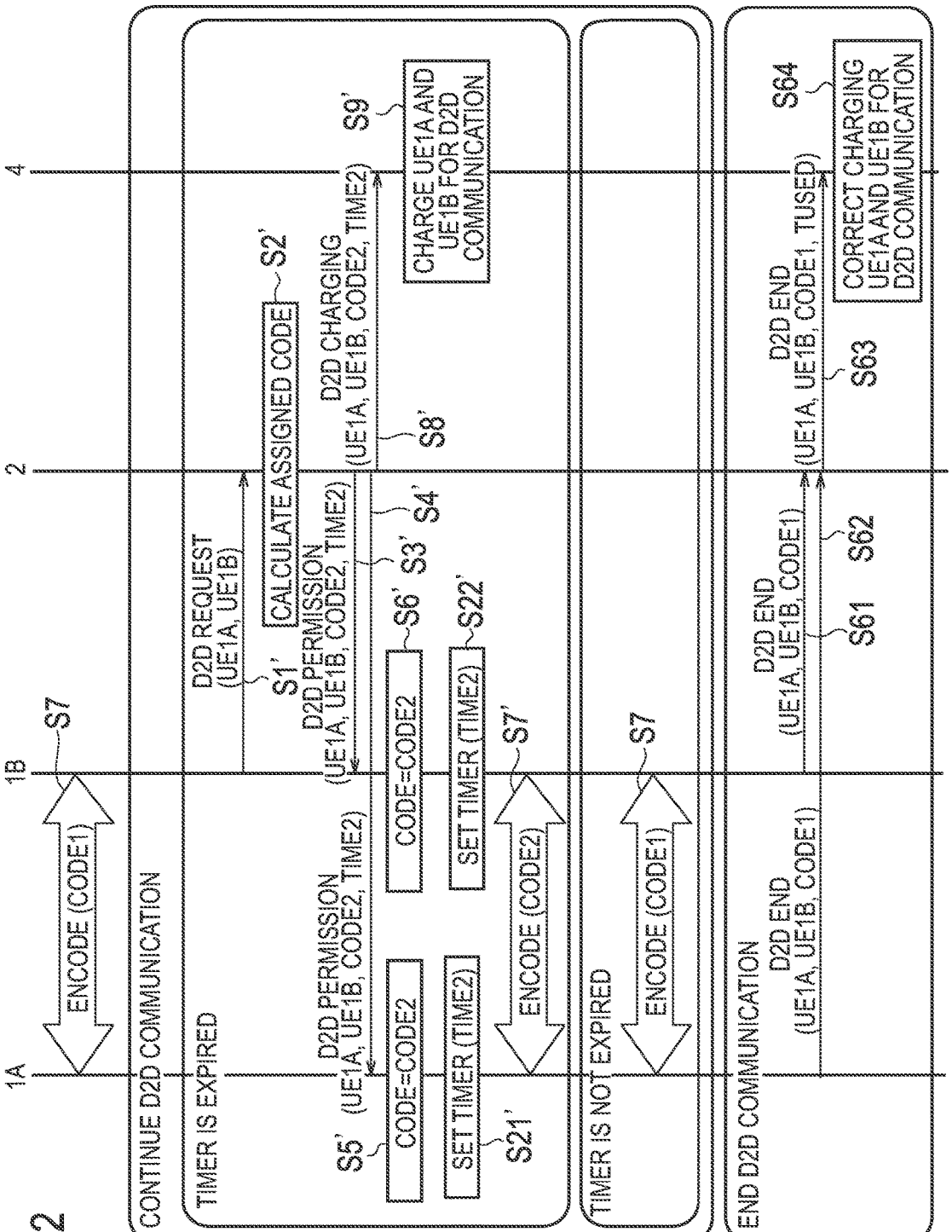
FIG. 22 is a sequence diagram according to a third modification of the second embodiment.

In a third modification of the second embodiment, when the UE 1A and UE 1B end the D2D communication before the valid time of a spread code expires, the UE 1A and UE 1B notify the eNB 2 of the end of the D2D communication. FIG. 22 is a sequence diagram according to the third modification of the second embodiment.

As illustrated in FIG. 22, when the UE 1A and UE 1B end the D2D communication and when the valid time of a spread code does not expire at the point of time (at the end of the D2D communication), the UE 1A and UE 1B notify the eNB 2 of the end of the D2D communication (S61, S62). Further, the eNB 2 notifies the charging server 4 of the end of the D2D communication by the UE 1A and UE 1B (S63). At this time, the eNB 2 measures the usage time of the assigned spread code and notifies the charging server 4 of the measured actual usage time (specifically, usage time from the assignment of the spread code until receiving a notification of the end of the D2D communication (S61, S62)). The charging server 4 decreases charging in accordance with the unused time (valid time of a spread code–actual usage time).

Alternatively, when the usage time of the spread code is measured in the UE 1A and UE 1B, upon notifying the eNB 2 of the end of the D2D communication (S61, S62), each of the UE 1A and UE 1B also notifies the eNB 2 of the measured usage time. The eNB 2 notifies the charging server 4 of the actual usage time measured in each of the UE 1A and UE 1B. The charging server 4 selects the longer usage time from the usage times measured in each of the UE 1A and UE 1B as the actual usage time, and decreases the charging in accordance with the unused time (valid time of a spread code–actual usage time).

As described above, in the third modification of the second embodiment, it is possible to charge more strictly in accordance with the D2D communication time.

Third Embodiment

Next, a third embodiment will be described regarding a difference from the above-described first embodiment and second embodiment. In the above-described first embodiment and second embodiment, the eNB 2 assigns a single type of the spread codes for the UE 1A and UE 1B. In this case, in order for the UE 1A and UE 1B to perform bidirectional D2D communication, it is necessary to perform half-duplex communication in which transmission and reception are switched in a time-division manner. In the third embodiment, two types of the spread codes are assigned, thereby realizing full-duplex D2D communication.

Figure 23:
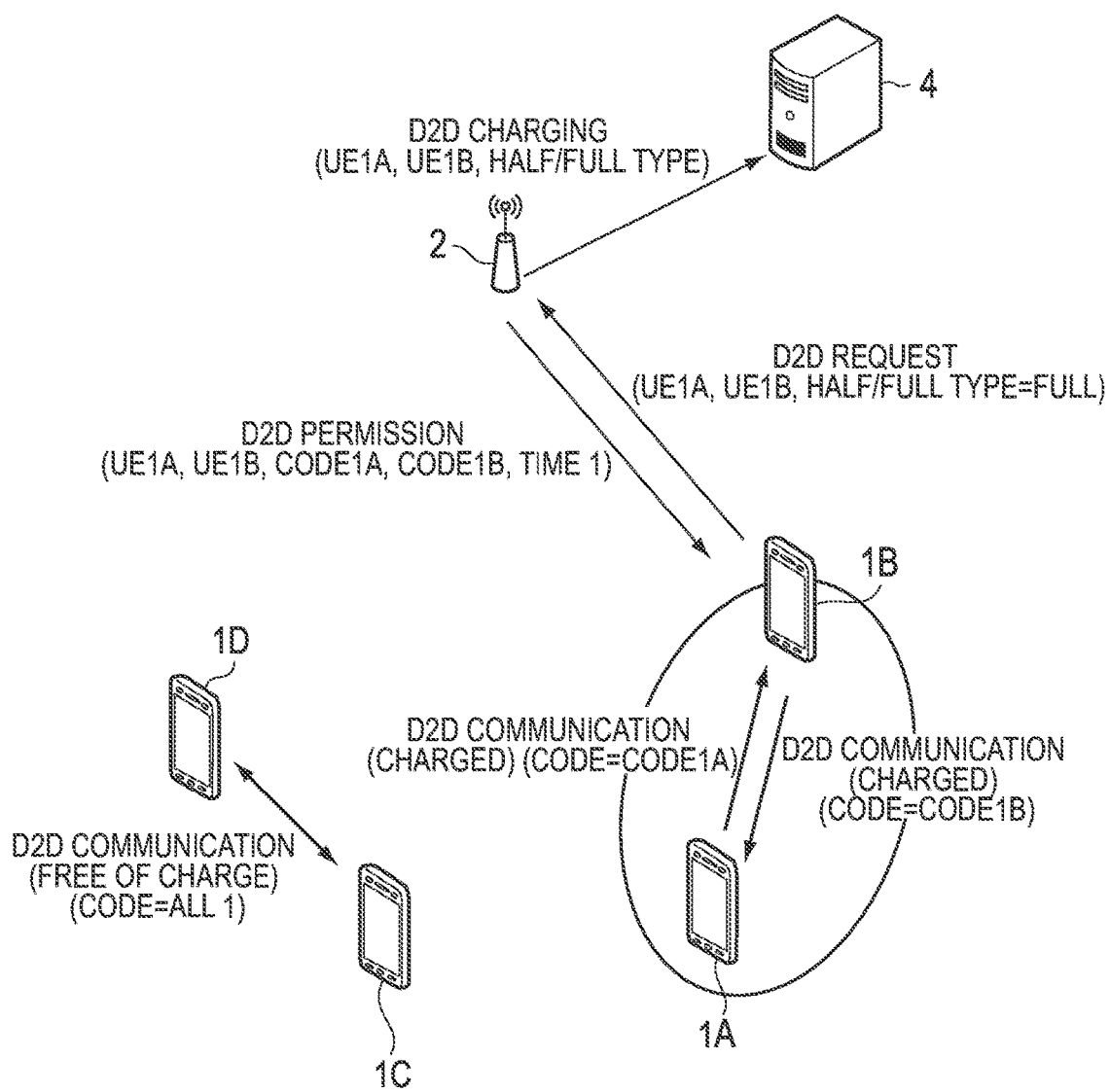
FIG. 23 is a diagram illustrating an operation overview according to a third embodiment.

FIG. 23 is a diagram illustrating an operation overview according to the third embodiment. As illustrated in FIG. 23, when the UE 1A and UE 1B request full-duplex communication (full type), the eNB 2 assigns the two types of the spread codes (for transmission and for reception) to the UE 1A and UE 1B. On the other hand, when the UE 1A and UE 1B request half-duplex communication (half type), the eNB 2 assigns a single type of the spread codes to the UE 1A and UE 1B.

Figure 24:
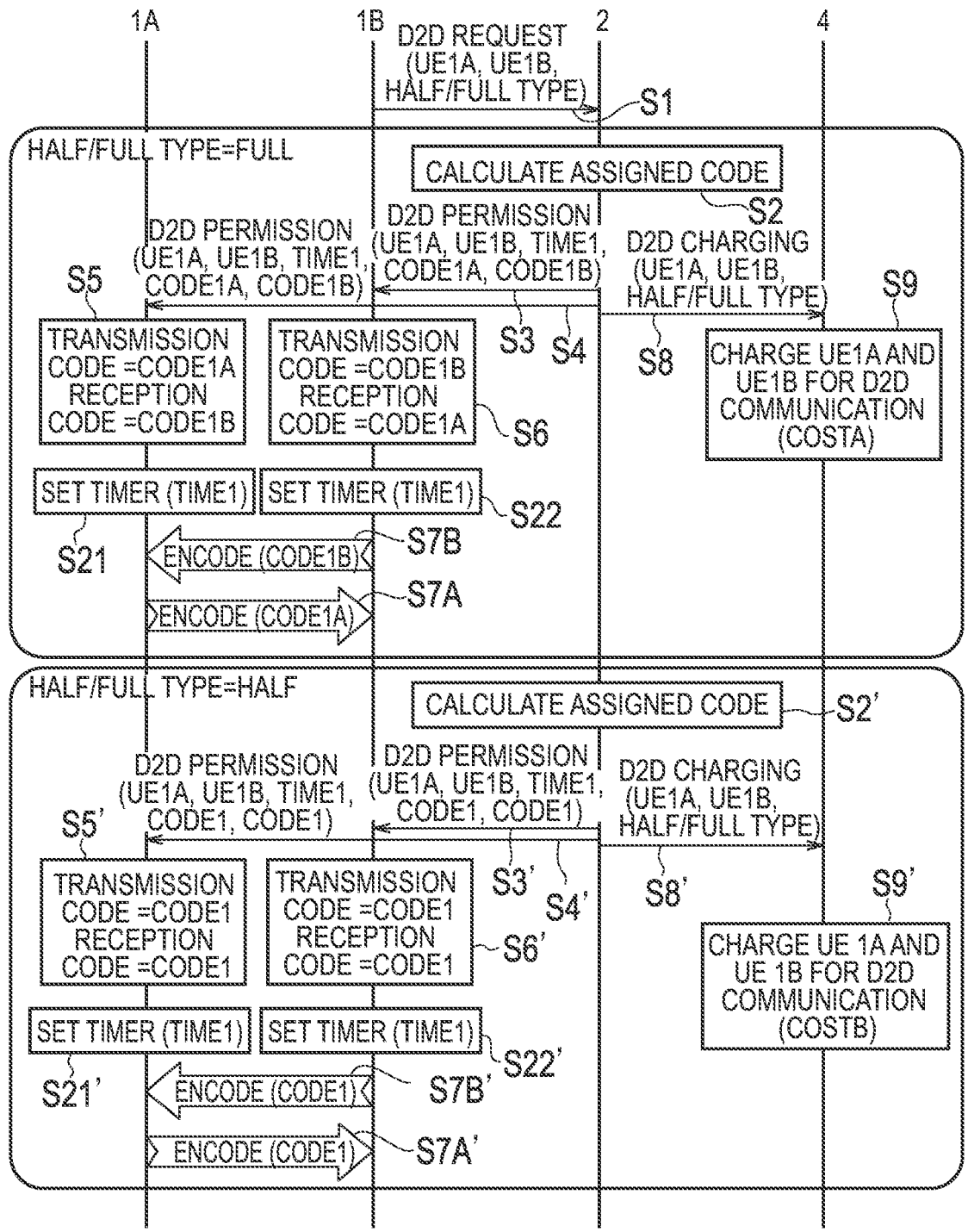
FIG. 24 is a sequence diagram according to the third embodiment.

FIG. 24 is a sequence diagram according to the third embodiment. Hereinafter, similar to the above-described modification of the second embodiment, an example in which only a single type of the timers is used will be described.

As illustrated in FIG. 24, the UE 1B transmits, to the eNB 2, a D2D request including information indicating which of the full-duplex communication or the half-duplex communication is requested (S1).

When the full-duplex communication is requested, the eNB 2 calculates two types of the spread codes (S2), and assigns the calculated spread codes to the UE 1A and UE 1B (S3, S4). The UE 1A and UE 1B set the two types of the spread codes (S5, S6). Then, the UE 1A and UE 1B set the timer (S21, S22) and perform the full-duplex D2D communication by using the set spread code (S7A, S7B).

On the other hand, when the half-duplex communication is requested, the eNB 2 calculates the single type of the spread codes (S2'), and assigns the calculated spread code to the UE 1A and UE 1B (S3', S4'). The UE 1A and UE 1B set the single type of the spread codes (S5', S6'). Then, the UE 1A and UE 1B set the timer (S21', S22') and perform the half-duplex D2D communication by using the set spread code (S7A', S7B').

The eNB 2 notifies the charging server 4 of the number of the assigned spread codes (S8, S8') and the charging server 4 performs charging in accordance with the number of the assigned spread codes (S9, S9'). The charging for the full-duplex communication (cost A) is set to be more expensive than the charging for the half-duplex communication (cost B).

As described above, in the third embodiment, the full-duplex D2D communication can be achieved. Further, it is possible that the charging is made different between the full-duplex D2D communication and the half-duplex D2D communication.

Fourth Embodiment

Next, a fourth embodiment will be described regarding a difference from the above-described first embodiment to third embodiment. In the above-described embodiments, it is assumed that the valid time of the spread code assigned by the eNB 2 is constant. In the fourth embodiment, the eNB 2 controls the valid time of the spread code on the basis of an elapsed time from when the UE 1A and UE 1B start the D2D communication.

Figure 25:
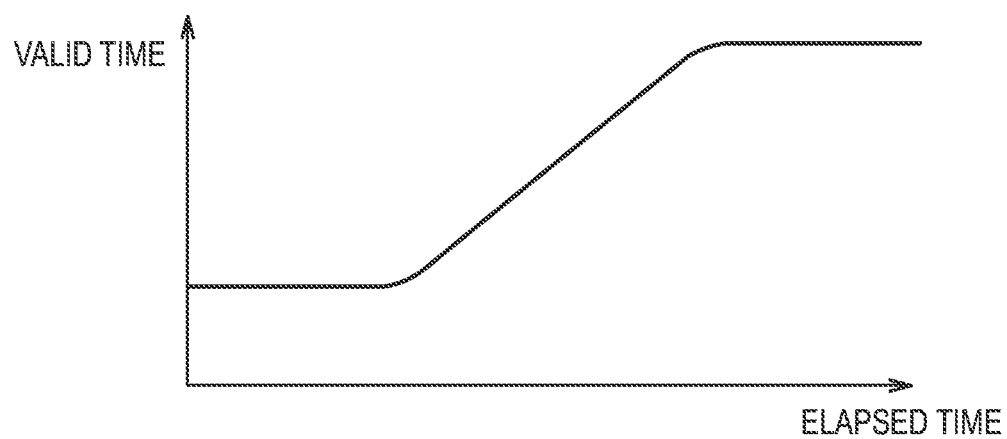
FIG. 25 is a diagram illustrating an operation overview according to a fourth embodiment.

FIG. 25 is a diagram illustrating an operation overview according to the fourth embodiment. As illustrated in FIG. 25, the eNB 2 elongates the valid time of the spread code each time the spread code is reassigned (updated). Thus, an update interval of the spread code is short at first, and then gradually becomes longer.

Figure 26:
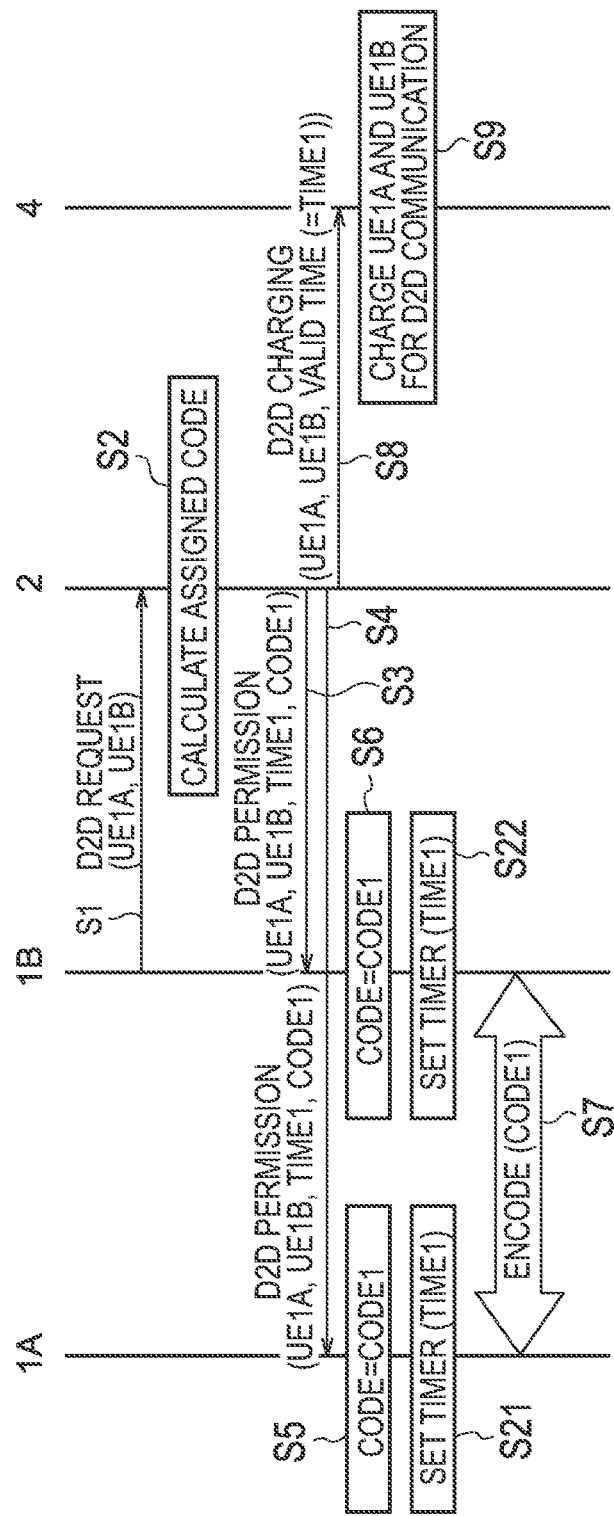
FIG. 26 is a sequence diagram according to the fourth embodiment.

FIG. 26 is a sequence diagram according to the fourth embodiment. As illustrated in FIG. 26, the procedures (S1 to S7) of assigning the spread code and the D2D communication using the spread code are similar to those in the above-described modifications of the embodiments. However, when assigning the spread code to the UE 1A and UE 1B, the eNB 2 sets, for the spread code, a valid time corresponding to the elapsed time from when the UE 1A and UE 1B start the D2D communication.

The eNB 2 notifies the charging server 4 of the valid time of the spread code in response to the assignment of the spread code to the UE 1A and UE 1B (S8). The charging server 4 performs charging in accordance with the notified valid time.

Alternatively, the eNB 2 may notify the charging server 4 of the elapsed time of the D2D communication, instead of notifying the charging server 4 of the valid time of the spread code. In this case, the charging server 4 performs charging in accordance with the notified elapsed time.

As described above, in the fourth embodiment, the time interval of reassignment of the spread code (that is, update interval) is elongated in accordance with the elapse of time of the D2D communication, and thus, it is possible to reduce a process load and signaling.

[First Modification of Fourth Embodiment]

Figure 27:
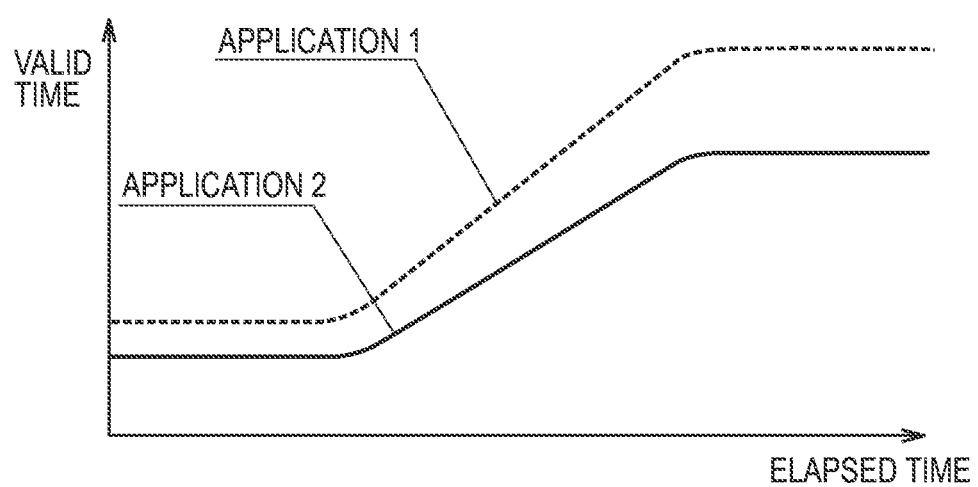
FIG. 27 is a diagram illustrating an operation overview according to a first modification of the fourth embodiment.

In a first modification of the fourth embodiment, the eNB 2 controls the valid time of the spread code on the basis of an application (hereinafter, an application used) which the UE 1A and UE 1B use for the D2D communication. FIG. 27 is a diagram illustrating an operation overview according to the first modification of the fourth embodiment.

As illustrated in FIG. 27, the eNB 2 makes the valid time of the spread code different in accordance with the application used, and thus the update interval of the spread code is optimized for the application used. For example, the update interval is elongated for an application 1 (such as a real time competition game and telephone call) in which communication is continuously performed, while the update interval is shortened for an application 2 (such as a competition game (hereinafter, shogi or a Japanese chess) and chat) in which communication is discontinuously performed.

Figure 28:
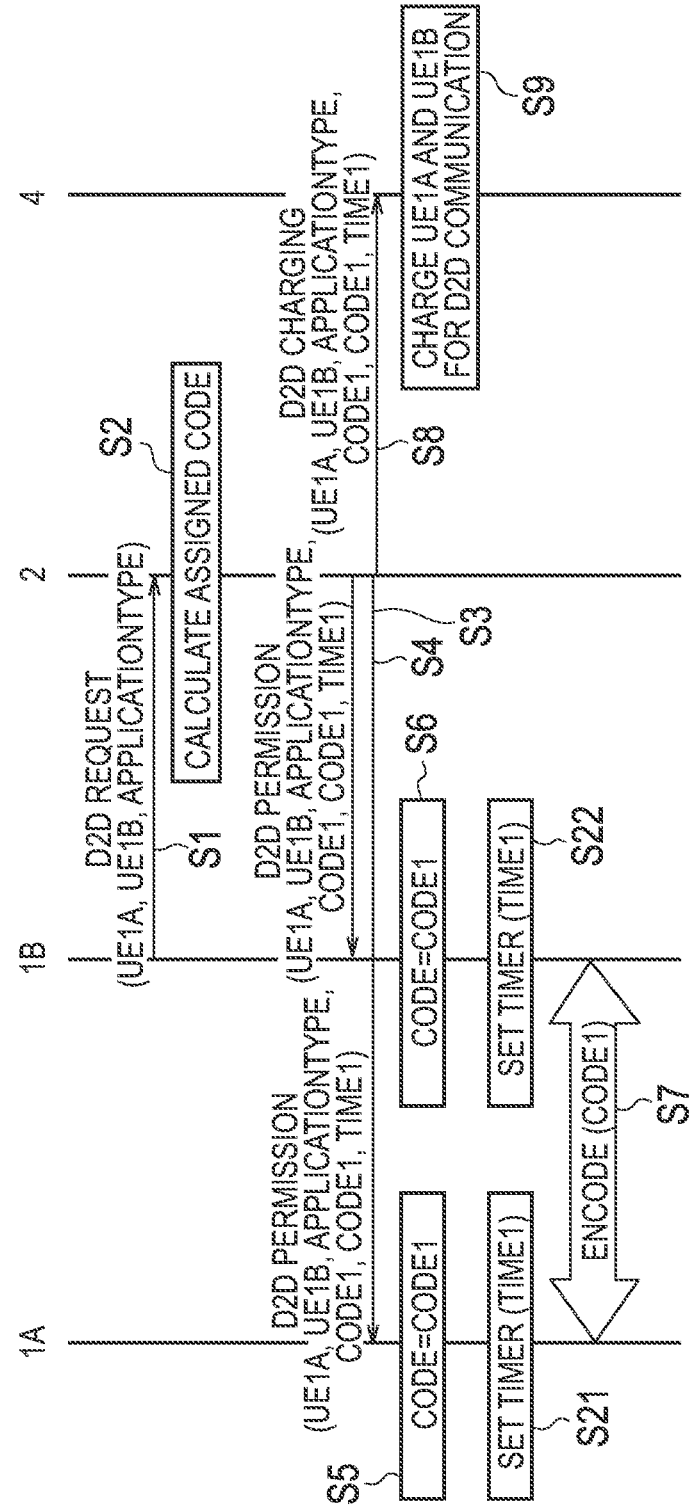
FIG. 28 is a sequence diagram according to the first modification of the fourth embodiment.

FIG. 28 is a sequence diagram according to the first modification of the fourth embodiment. As illustrated in FIG. 28, the UE 1B transmits, to the eNB 2, a D2D request including the application information on the application used (S1). In this case, the application information is an identifier indicating an application, an application type, QoS that is requested for the application, bearer identification information or the like.

The eNB 2 calculates the spread code and the valid time in accordance with the application used (S2). Further, when assigning the calculated spread code to the UE 1A and UE 1B (S3, S4), the eNB 2 notifies the UE 1A and UE 1B of the valid time in accordance with the application used. Further, the eNB 2 notifies the charging server 4 of the application used (S8). The charging server 4 performs charging in accordance with the notified application used (S9).

As described above, in the first modification of the fourth embodiment, the update interval of the spread code is optimized for the application used.

Figure 29:
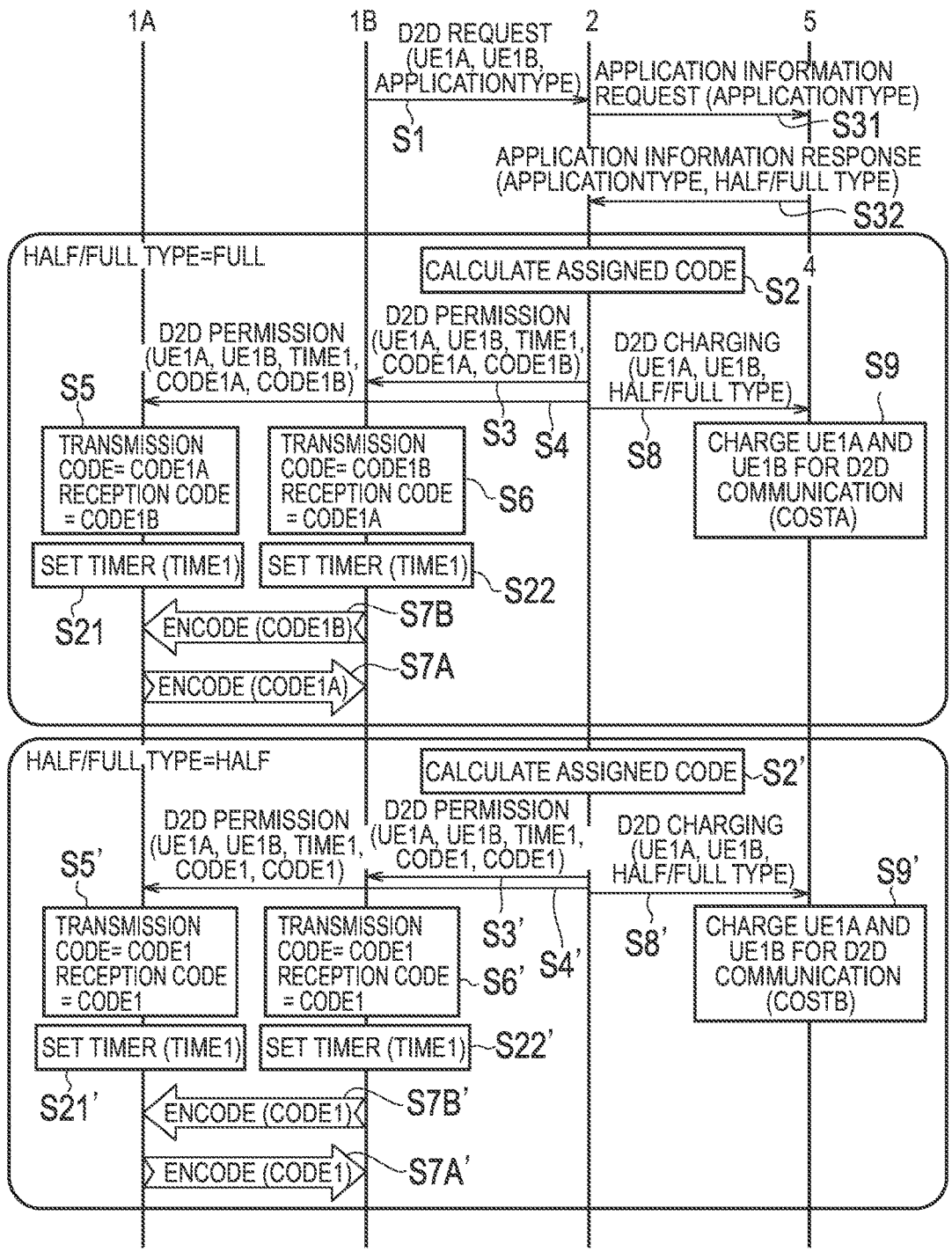
FIG. 29 is a sequence diagram obtained by changing a part of the sequence of FIG. 28.

It is noted that the application information in the modification may be applied to the above-described third embodiment. FIG. 29 is a sequence diagram obtained by changing a part of the sequence of FIG. 28.

As illustrated in FIG. 29, the UE 1B transmits, to the eNB 2, the D2D request including the application information on the application used (S1). The eNB 2 inquires, of an application management server 5, which of the full-duplex communication and half-duplex communication is suitable for the application used (S31, S32). The application management server 5 is provided in the EPC 20, for example.

When it is determined that the application used is suitable for the full-duplex communication, the eNB 2 calculates two types of the spread codes (S2), and assigns the calculated spread codes to the UE 1A and UE 1B (S3, S4). The UE 1A and UE 1B set the two types of the spread codes (S5, S6). Then, the UE 1A and UE 1B set the timer (S21, S22) and perform the full-duplex D2D communication by using the set spread code (S7A, S7B).

On the other hand, when it is determined that the application used is suitable for the half-duplex communication, the eNB 2 calculates a single type of the spread codes (S2'), and assigns the calculated spread code to the UE 1A and UE 1B (S3', S4'). The UE 1A and UE 1B set the single type of the spread codes (S5', S6'). Then, the UE 1A and UE 1B set the timer (S21', S22') and perform the half-duplex D2D communication by using the set spread code (57A', S7B').

[Second Modification of Fourth Embodiment]

Figure 30:
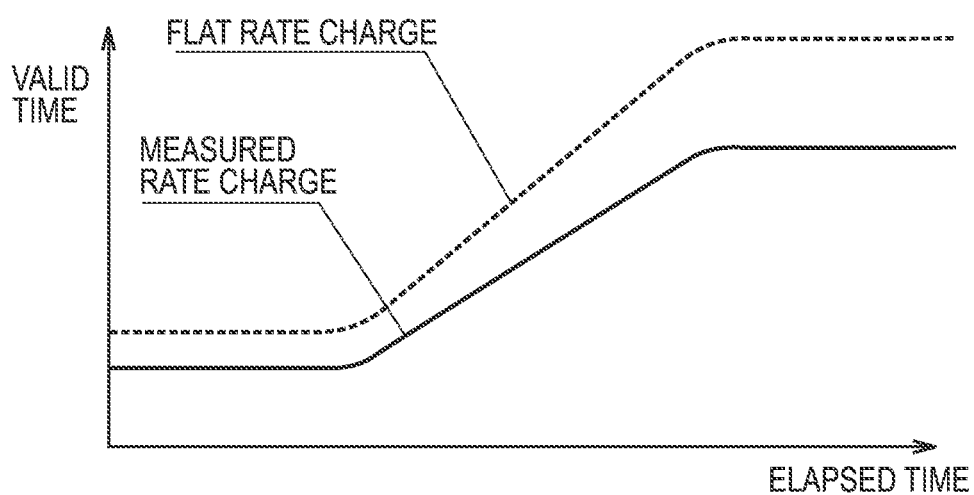
FIG. 30 is a diagram illustrating an operation overview according to a second modification of the fourth embodiment.

In a second modification of the fourth embodiment, the eNB 2 controls the valid time of the spread code on the basis of a billing contract of the UE 1A and UE 1B. The billing contract may be a billing contract for both of cellular communication and D2D communication or a billing contract only for D2D communication. FIG. 30 is a diagram illustrating an operation overview according to the second modification of the fourth embodiment.

As illustrated in FIG. 30, the eNB 2 makes the valid time of the spread code different in accordance with the billing contract of the UE 1A and UE 1B, and thus, the update interval of the spread code is optimized for the billing contract. For example, the update interval is elongated for flat rate charge, while the update interval is shortened for measured rate charge.

Figure 31:
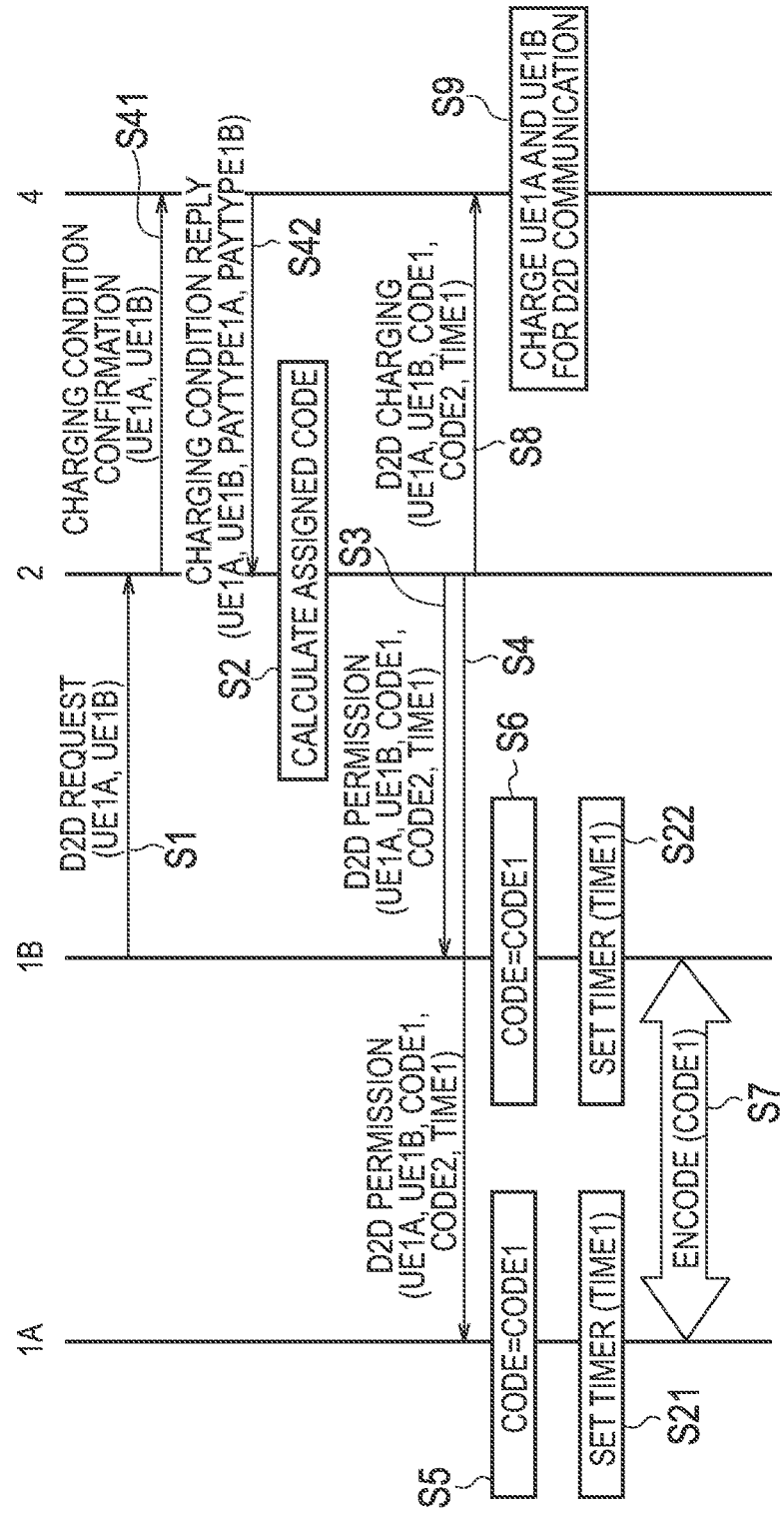
FIG. 31 is a sequence diagram according to the second modification of the fourth embodiment.

FIG. 31 is a sequence diagram according to the second modification of the fourth embodiment. As illustrated in FIG. 31, the eNB 2 that has received the D2D request inquires of the charging server 4 about the condition of the billing contract of the UE 1A and UE 1B (S41, S42). Further, the eNB 2 calculates the spread code and the valid time in accordance with the billing contract (S2). When assigning the calculated spread code to the UE 1A and UE 1B (S3, S4), the eNB 2 notifies the UE 1A and UE 1B of the valid time in accordance with the billing contract. The charging server 4 performs charging in accordance with the billing contract of the UE 1A and UE 1B (S9).

As described above, in the second modification of the fourth embodiment, the update interval of the spread code is optimized for the billing contract.

[Third Modification of Fourth Embodiment]

In a third modification of the fourth embodiment, the eNB 2 controls the valid time of the spread code on the basis of movement speed of the UE 1A and UE 1B. It is noted that a technique for obtaining the movement speed is well-known, and thus a description thereof will be omitted.

Figure 32:
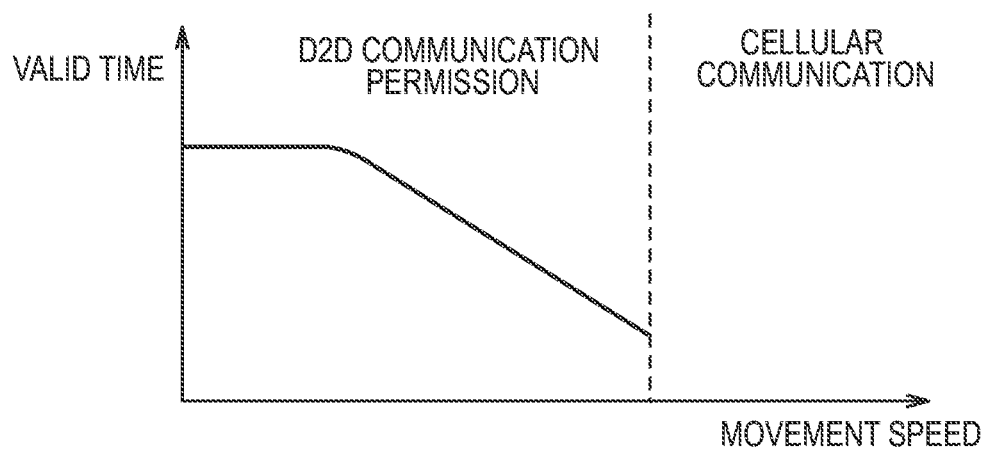
FIG. 32 is a diagram illustrating an operation overview according to a third modification of the fourth embodiment.

FIG. 32 is a diagram illustrating an operation overview according to the third modification of the fourth embodiment. As illustrated in FIG. 32, the eNB 2 makes the valid time of the spread code different in accordance with the movement speed of the UE 1A and UE 1B, and thus, the update interval of the spread code is optimized for the movement speed. For example, the update interval becomes shorter as the movement speed increases. Further, when at least one of the UE 1A and UE 1B moves at no less than certain speed (that is, moves at high speed), the eNB 2 causes the UE 1A and UE 1B to perform the cellular communication rather than the D2D communication.

Preferably, the eNB 2 sets the valid time of the spread code to a time equal to or shorter than a time during which the UE 1A and UE 1B camp in the coverage of the cell of the eNB 2 on the basis of the movement speed. Thus, the valid time also depends on the cell size, and therefore, the eNB 2 may regulate the valid time in accordance with the size of the cell of the eNB 2. For example, in a case of a pico cell or a femto cell, the valid time is shortened.

As described above, in the third modification of the fourth embodiment, the update interval of the spread code is optimized for the movement speed.

Fifth Embodiment

Next, a fifth embodiment will be described regarding a difference from the above-described first embodiment to fourth embodiment. In the fifth embodiment, the eNB 2 controls the code length of the spread code to be assigned to the UE 1A and UE 1B on the basis of the communication quality of the D2D communication.

Figure 33:
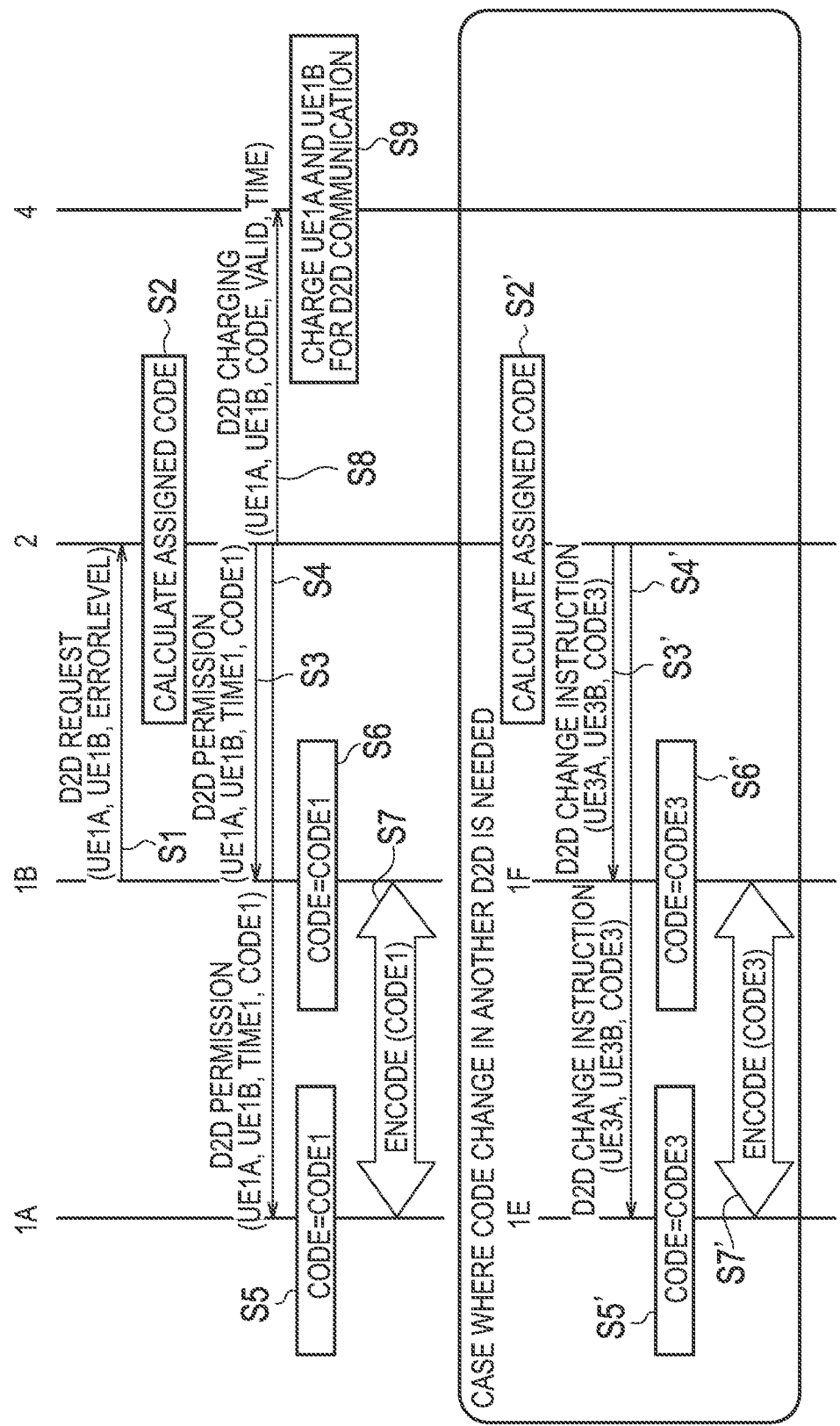
FIG. 33 is a sequence diagram according to a fifth embodiment.

FIG. 33 is a sequence diagram according to the fifth embodiment. As illustrated in FIG. 33, the UE 1B transmits, to the eNB 2, a D2D request including the error level information indicating the communication quality in the D2D communication (S1).

The eNB 2 calculates the spread code having an appropriate code length on the basis of the error level information included in the D2D request (S2). As described above, the error level information is information such as channel information, interference power, a path loss, or the (mean) number of times of retransmissions. For example, when the path loss is small while the interference power is high (or retransmission occurs frequently), the eNB 2 elongates the code length of the spread code in order to provide higher orthogonality. Further, the eNB 2 assigns the calculated spread code to the UE 1A and UE 1B (S3, S4).

It is noted that there is a case where a change in the code length of the spread code to be assigned to another UE 1 (UE 1E, UE 1F) is needed due to the change in the code length of the spread code to be assigned to the UE 1A and UE 1B. In this case, the eNB 2 assigns a new spread code to the other UE 1 (UE 1E, UE 1F) (S3', S4').

As described above, in the fifth embodiment, it is possible to improve the communication quality of the D2D communication by changing the code length of the spread code.

[First Modification of Fifth Embodiment]

In a first modification of the fifth embodiment, the code length of the spread code is controlled on the basis of the number of the UEs 1 (specifically, the number of the UEs 1 performing the D2D communication) which camp on the cell of the eNB 2.

Figure 34:
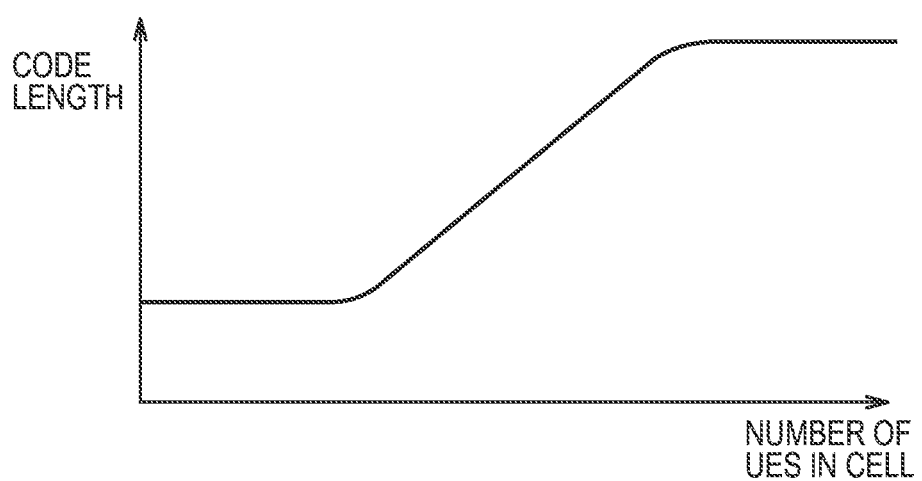
FIG. 34 is a diagram illustrating an operation according to a first modification of the fifth embodiment.

FIG. 34 is a diagram illustrating an operation according to the first modification of the fifth embodiment. As illustrated in FIG. 34, the eNB 2 elongates the code length of the spread code in order to provide higher orthogonality as the number of the UEs 1 performing the D2D communication increases in the cell of the eNB 2.

As described above, in the first modification of the fifth embodiment, it is possible to improve the communication quality of the D2D communication under a situation where the deterioration in communication quality of the D2D communication easily occurs.

[Second Modification of Fifth Embodiment]

In a second modification of the fifth embodiment, the UE 1A and UE 1B request the eNB 2 to reassign the spread code in response to detection of deterioration in communication quality of the D2D communication, even before the valid time of the spread code expires. The eNB 2 assigns a spread code having a code length longer than that of the spread code to the UE 1A and UE 1B on the basis of the request.

Figure 35:
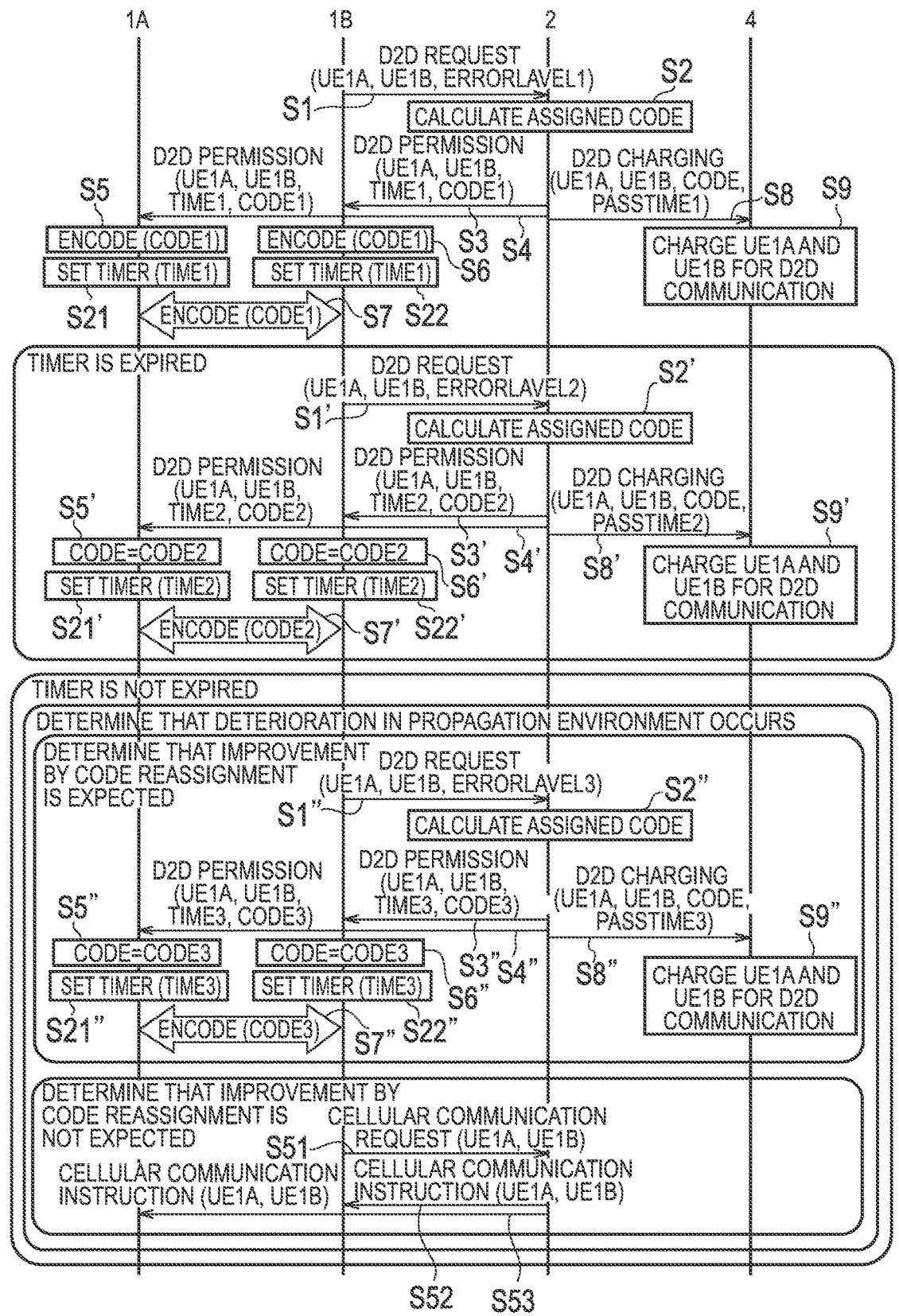
FIG. 35 is a sequence diagram according to a second modification of the fifth embodiment.

FIG. 35 is a sequence diagram according to the second modification of the fifth embodiment. As illustrated in FIG. 35, the UE 1B detects the deterioration in communication quality of the D2D communication before the valid time of the spread code expires (that is, before the timer expires). For example, the UE 1B detects the deterioration in communication quality of the D2D communication on the basis of information (error level information) such as channel information, interference power, a path loss, or the (mean) number of times of retransmissions. The error level information can be calculated on the basis of a reference signal having known transmission power and timing, which is transmitted and received in the D2D communication.

When detecting the deterioration in communication quality of the D2D communication and when determining that the communication quality will improve by assigning the spread code, the UE 1B requests the eNB 2 to reassign the spread code (S1"). For example, when the received power of a reference signal from the UE 1A is sufficient (that is, the path loss is small), while the interference power is high (or retransmission occurs frequently), the UE 1B determines that the communication quality will improve by reassigning the spread code. In this case, the UE 1B transmits, to the eNB 2, a D2D request including the error level information indicating the communication quality in the D2D communication. The eNB 2 calculates the spread code having an appropriate code length on the basis of the error level information included in the D2D request (S2"). In this case, the eNB 2 calculates the spread code having the code length longer than that of the spread code previously assigned. Further, the eNB 2 assigns the calculated spread code to the UE 1A and UE 1B (S3", S4").

On the other hand, when detecting deterioration in communication quality of the D2D communication and when determining that the communication quality will not improve by assigning the spread code, the UE 1B requests the eNB 2 to switch to cellular communication (S51). For example, when the received power of a reference signal from the UE 1A is low (that is, the path loss is large), the UE 1B determines that improvement in the communication quality by reassigning the spread code is not expected. In this case, the eNB 2 instructs the UE 1A and UE 1B to switch to the cellular communication in response to the request to switch to the cellular communication (S52, S53).

As described above, in the second modification of the fifth embodiment, it is possible to improve the communication quality of the D2D communication by changing the code length of the spread code.

[Third Modification of Fifth Embodiment]

In the above-described fifth embodiment and the modifications thereof, the communication speed (data rate)

becomes lower as the code length of the spread code is elongated. Therefore, in a case where the communication speed becomes lower than a certain speed by elongating the code length of the spread code, the eNB 2 or UE 1 may control to perform switching from the D2D communication to the cellular communication. In this case, the certain speed may be a communication speed requested by the application in use.

Sixth Embodiment

Next, a sixth embodiment will be described regarding a difference from the above-described first embodiment to fifth embodiment. In the sixth embodiment, the UE 1 performing the D2D communication transmits, to the eNB 2, a request for the assignment of the spread code on the basis of an increase and decrease in the number of UEs included in a D2D UE group to which the UE 1 belongs.

Figure 36:
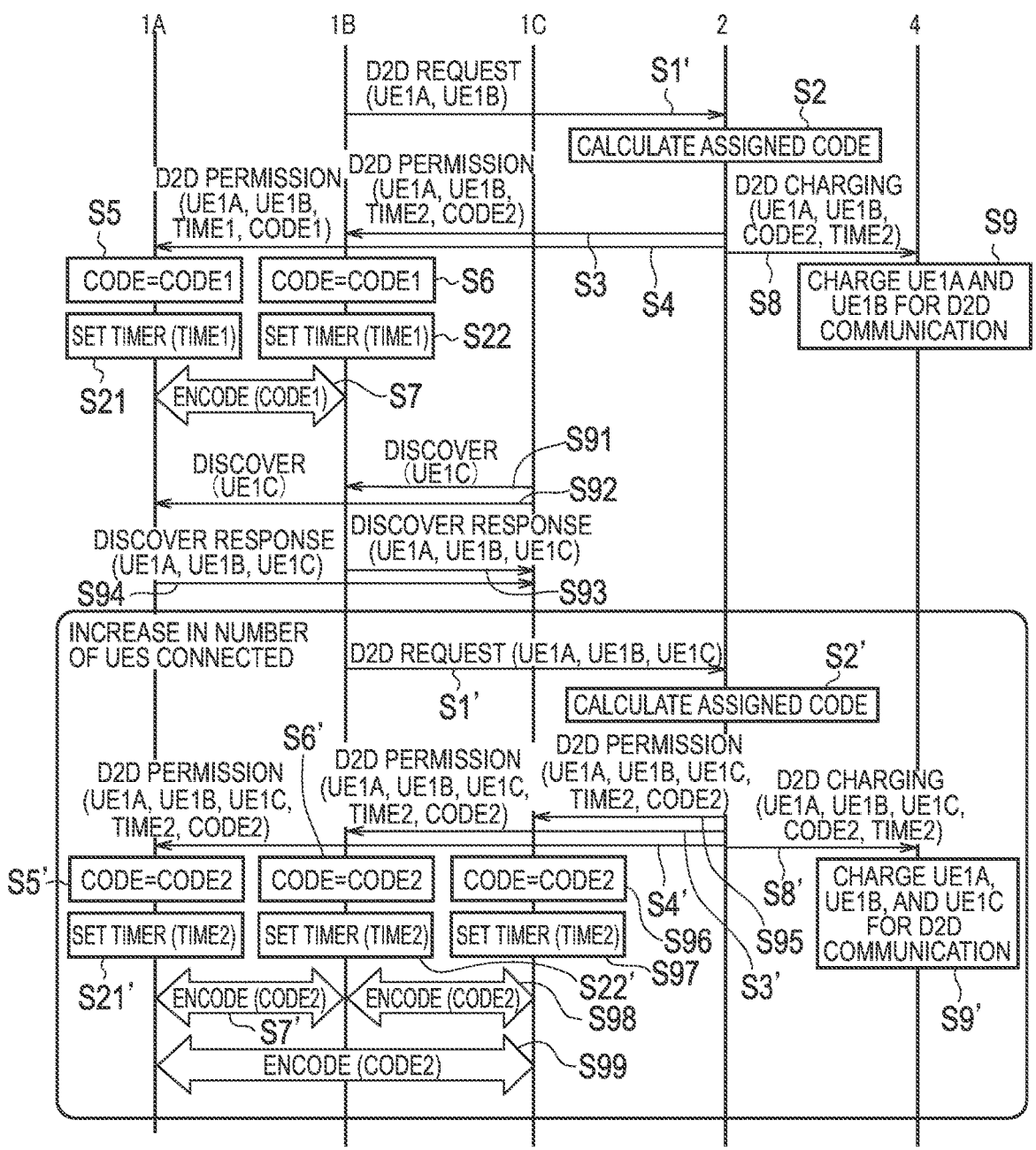
FIG. 36 is a sequence diagram when the number of UEs included in a D2D UE group increases according to a sixth embodiment.

FIG. 36 is a sequence diagram when the number of UEs included in the D2D UE group increases. Hereinafter, a case where the UE 1C is added to the D2D UE group after starting the D2D communication in a D2D UE group including the UE 1A and UE 1B (S7) will be described. As illustrated in FIG. 36, the UE 1C transmits the Discovery signal (S91, S92). The Discovery signal is a signal that is used in the discovery process of discovering a neighboring UE that should be a communication partner in the D2D communication. The UE 1A and the UE 1B receive the Discovery signal from the UE 1C, and transmits, to the UE 1C, a response to the Discovery signal (S93, S94).

The UE 1B transmits, to the eNB 2, a D2D request to add the UE 1C to the D2D UE group (S1'). The eNB 2 calculates a spread code (S2') and assigns the spread code to the UE 1A to the UE 1C (S3', S4', S95). As a result, the D2D communication by the UE 1A to the UE 1C starts. Further, the eNB 2 notifies the charging server 4 of the addition of the UE 1C (S8'), and the charging server 4 charges the UE 1C.

Figure 37:
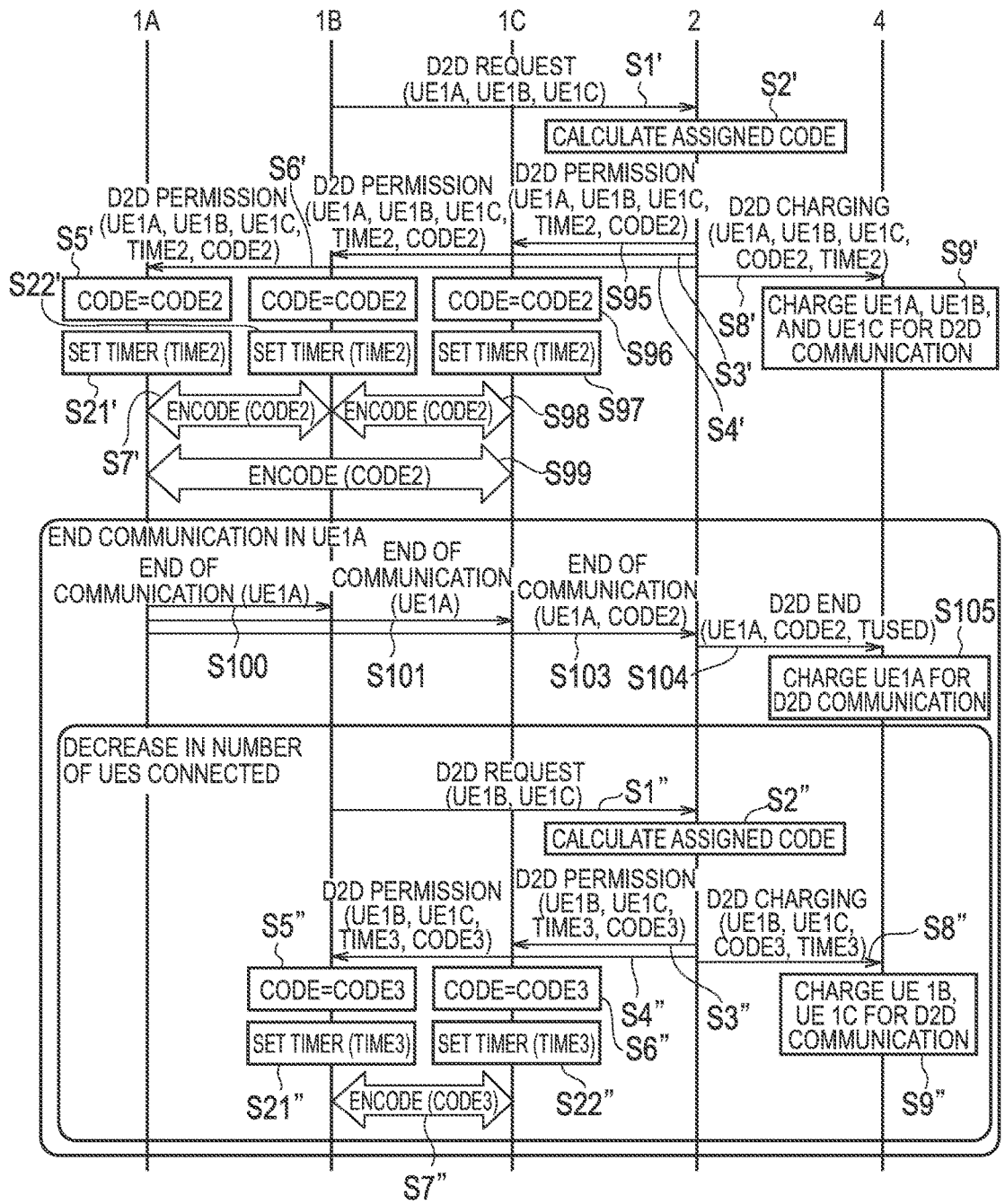
FIG. 37 is a sequence diagram when the number of UEs included in the D2D UE group decreases according to the sixth embodiment.

FIG. 37 is a sequence diagram when the number of UEs included in the D2D UE group decreases. Hereinafter, a case where the UE 1A separates from the D2D UE group after starting the D2D communication by the UE 1A to the UE 1C will be described. As illustrated in FIG. 37, the UE 1A that ends the D2D communication notifies the UE 1B, the UE 1C, and the eNB 2 of that effect (S100, S101, S103). At this time, the UE 1A may notify the eNB 2 of the spread code that the UE 1A has used. The eNB 2 notifies the charging server 4 of the end of the D2D communication in the UE 1A (and the usage time of the spread code) (S104). The charging server 4 ends the charging for the UE 1A (and decreases the charging in accordance with the unused time) (S105). Then, the D2D communication by the UE 1B and the UE 1C is performed.

As described above, in the sixth embodiment, it is possible to appropriately assign the spread code in accordance with an increase and decrease in the number of UEs included in the D2D UE group.

[First Modification of Sixth Embodiment]

In a first modification of the sixth embodiment, the assignment of the spread code is controlled at the initiative of the eNB 2 in accordance with an increase and decrease in the number of UEs included in the D2D UE group. For example, when the number of the UEs included in the D2D UE group increases, it is necessary to increase assignment of the spread code in order to perform the full-duplex communication between the UEs. In such a case, the eNB 2 increases the assignment of the spread code for the D2D UE group according to the determination of the eNB 2 itself.

When increasing assignment of the spread code, the charging server 4 may divide the charging for use of the spread code among all the UEs included in the D2D UE group or among respective UEs using the spread code for transmission.

[Second Modification of Sixth Embodiment]

In a second modification of the sixth embodiment, the eNB 2 denies the assignment of the spread code on the basis of a billing contract of each UE included in the D2D UE group to which the UE 1 requesting the assignment of the spread code belongs. Specifically, the eNB 2 denies the assignment of the spread code to the D2D UE group when UE under a billing contract (for example, the measured rate charge) in which the D2D communication is not permitted is included in the D2D UE group. The billing contract can be comprehended by inquiring of the charging server 4. Further, when the eNB 2 denies the assignment of the spread code, the eNB 2 may notify the UE to be denied, of the reason for the denial (for example, the fact of the measured rate charge).

Seventh Embodiment

Next, a seventh embodiment will be described regarding a difference from the above-described first embodiment to sixth embodiment. In the seventh embodiment, an assignment situation of the spread code is shared among neighboring cells.

Figure 38:
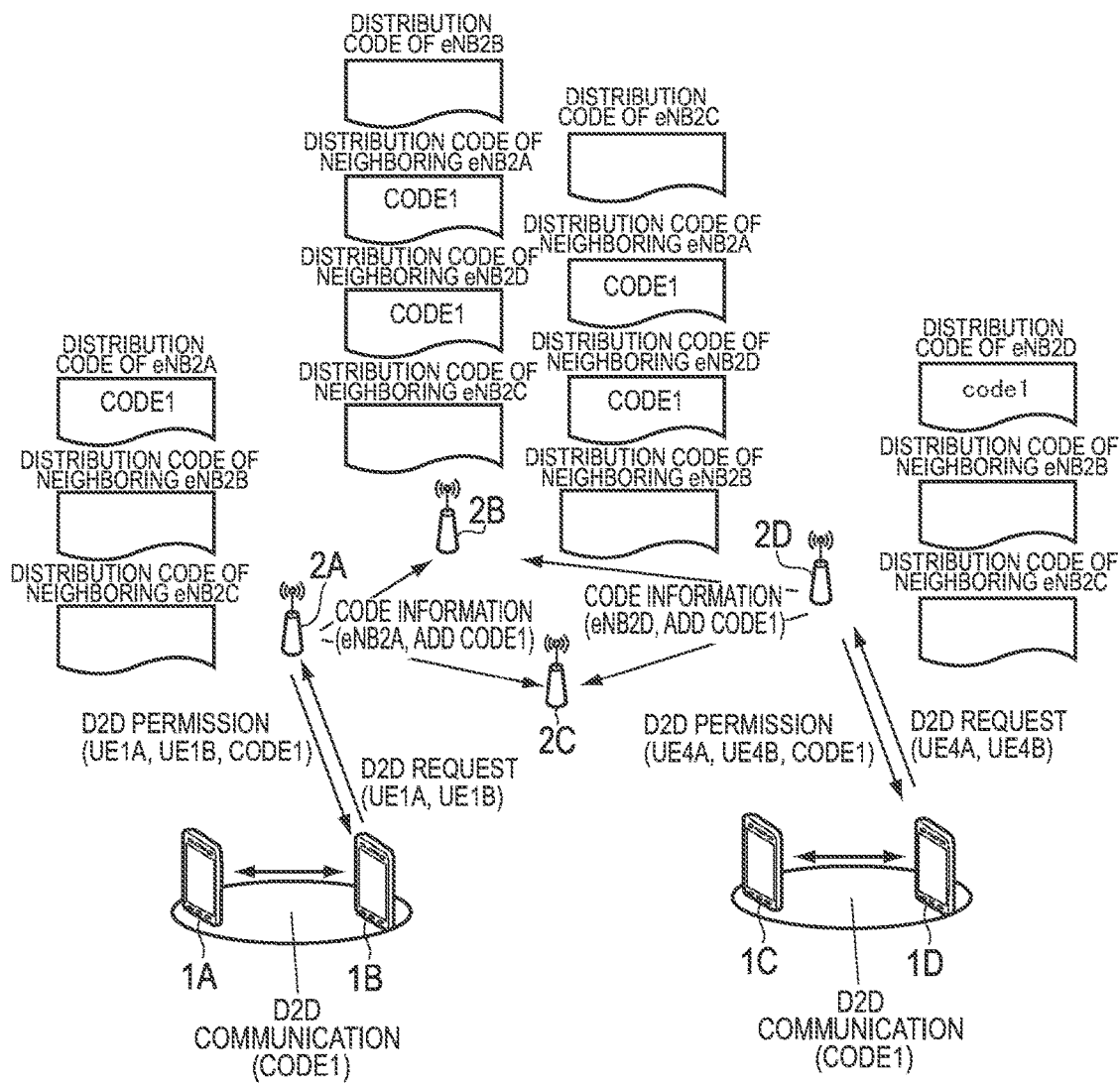
FIG. 38 is a diagram illustrating an operation according to a seventh embodiment (part 1).
Figure 39:
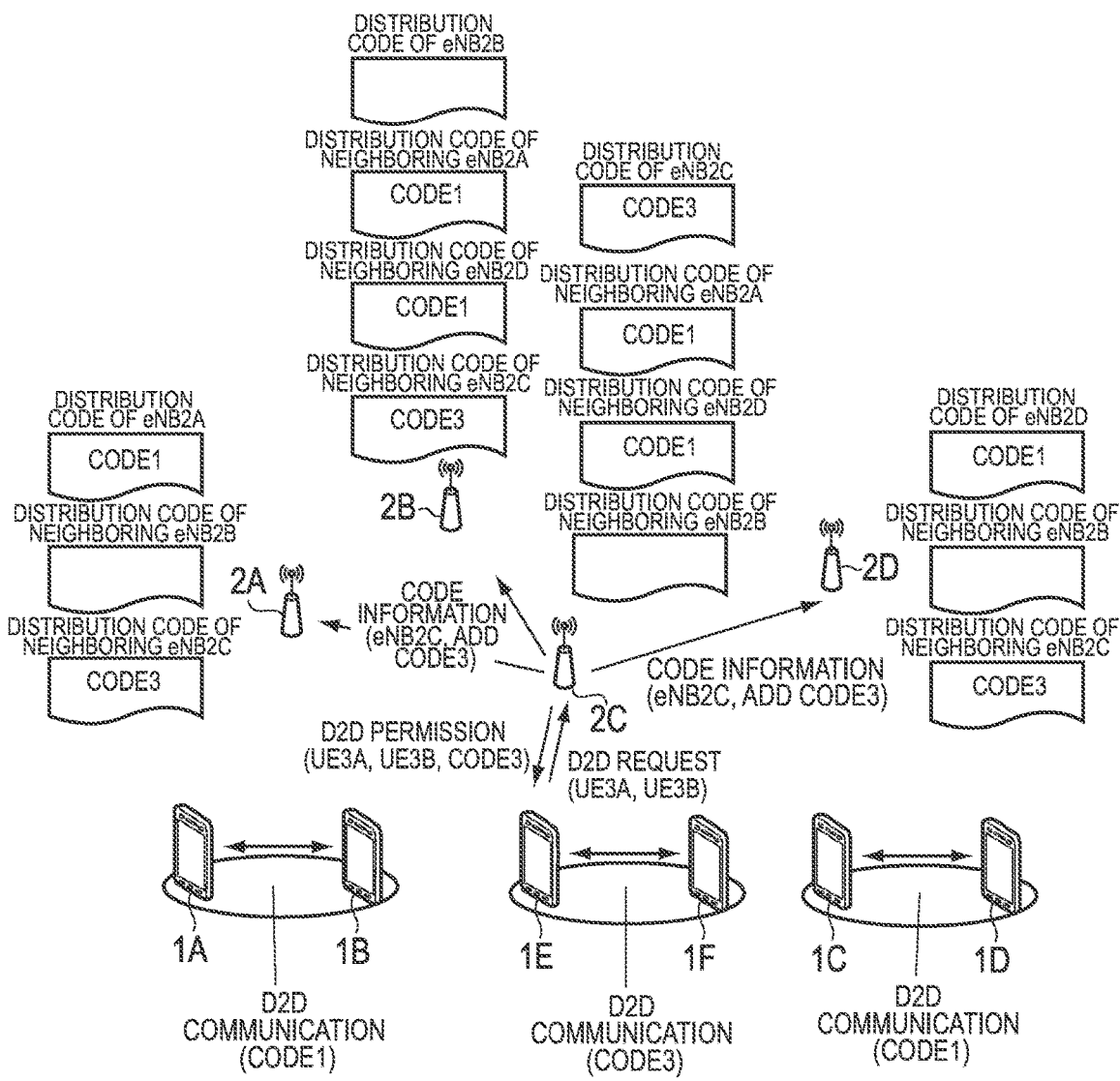
FIG. 39 is a diagram illustrating an operation according to the seventh embodiment (part 2).
Figure 40:
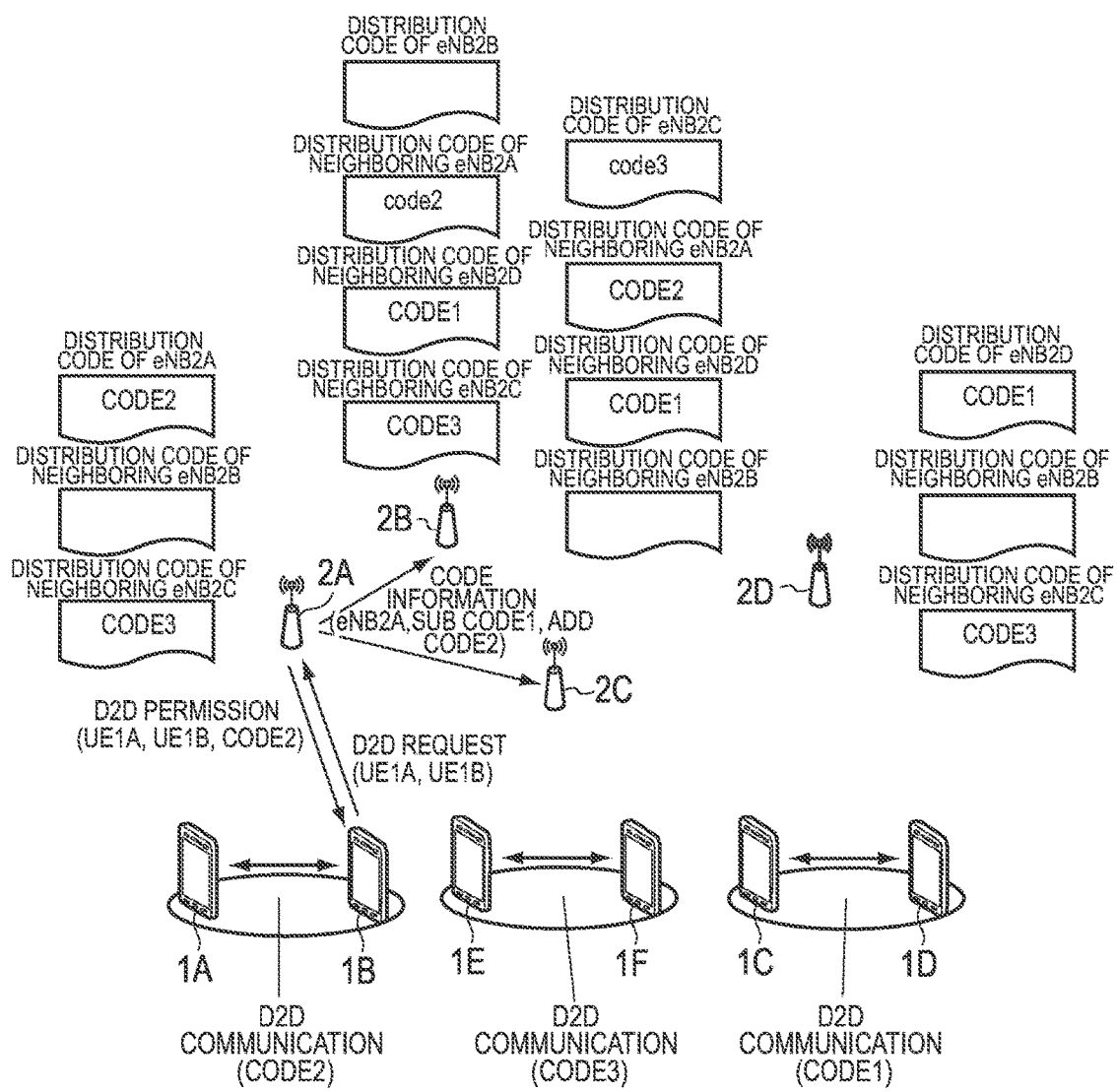
FIG. 40 is a diagram illustrating an operation according to the seventh embodiment (part 3).

FIG. 38 to FIG. 40 are diagrams illustrating an operation according to the seventh embodiment. As illustrated in FIG. 38, the eNB 2A stores the spread code (code1) assigned to the UE 1A and UE 1B as a spread code assigned by the eNB 2A (hereinafter, distribution code). The eNB 2A notifies the eNB 2B and eNB 2C, which are adjacent to the eNB 2A, of the distribution code (code1) of the eNB 2A, respectively. The eNB 2B and eNB 2C store the distribution code (code1) of the eNB 2A, respectively.

The eNB 2D stores the spread code (code1) assigned to the UE 1C and UE 1D as a distribution code of the eNB 2D. The eNB 2D notifies the eNB 2B and eNB 2C, which are adjacent to the eNB 2D, of the distribution code (code1) of the eNB 2D, respectively. The eNB 2B and eNB 2C store the distribution code (code1) of the eNB 2D, respectively.

As illustrated in FIG. 39, the eNB 2C assigns a spread code (code3) to the UE 1E and UE 1E The eNB 2C stores the spread code (code3) assigned to the UE 1E and UE 1F as a distribution code of the eNB 2C. The eNB 2C notifies the eNB 2A, eNB 2B, and eNB 2D, which are adjacent to the eNB 2C, of the distribution code (code3) of the eNB 2C, respectively. The eNB 2A, eNB 2B, and eNB 2D store the distribution code (code3) of the eNB 2C, respectively.

As illustrated in FIG. 40, the eNB 2A reassigns a spread code (code2) to the UE 1A and UE 1B. The eNB 2A updates the distribution code of the eNB 2A to the spread code (code2) assigned to the UE 1A and UE 1B. The eNB 2A notifies the eNB 2B and eNB 2C, which are adjacent to the eNB 2A, of the distribution code (code1) released from the assignment and the distribution code (code2) newly assigned. The eNB 2B and eNB 2C delete the distribution code (code1) released by the eNB 2A and store the distribution code (code2) newly assigned by the eNB 2A, as a distribution code of the eNB 2A, respectively.

As described above, in the seventh embodiment, each eNB 2 comprehends the distribution code of the neighboring eNB 2, and thus, each eNB 2 can assign a spread code without overlapping with that of the neighboring eNB 2, and thus, it is possible to suppress the interference between the D2D communications. For example, even when the UE 1A and UE 1B to which the spread code is assigned by the cell of the eNB 2A move into the cell of the eNB 2A adjacent to the eNB 2A, the D2D communication can be continued with no occurrence of interference in the cell of the eNB 2A.

Eighth Embodiment

Next, an eighth embodiment will be described regarding a difference from the above-described first embodiment to seventh embodiment. In the above-described embodiment, the assignment of the spread code is performed by the eNB 2. In the eighth embodiment, the assignment of the spread code is performed by the network node that is shared by a plurality of communication providers (carriers).

Figure 41:
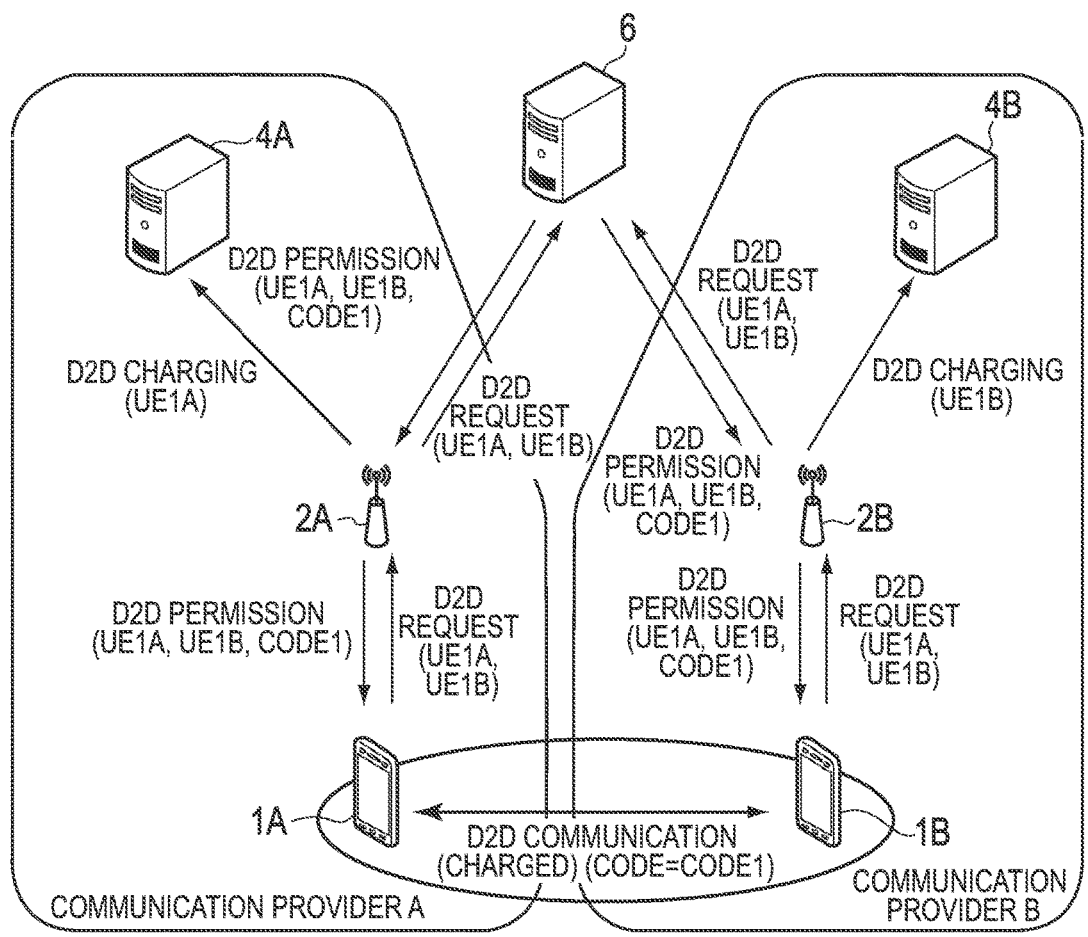
FIG. 41 is a diagram illustrating an operation environment according to an eighth embodiment.

FIG. 41 is a diagram illustrating an operation environment according to the eighth embodiment. As illustrated in FIG. 41, the UE 1A, the eNB 2A, and a charging server 4A belong to a communication provider A. The UE 1B, the eNB 2B, and a charging server 4B belong to a communication provider B. When the D2D communication is performed by the UE 1A and UE 1B in such an operation environment, it is difficult for the eNB 2A and eNB 2B to assign, in a coordinated manner, the spread code to the UE 1A and UE 1B.

Therefore, in the eighth embodiment, an assignment management server 6 shared by the communication providers A and B assigns the spread code to the UE 1A and UE 1B. The UE 1A and UE 1B notify the assignment management server 6 of the D2D request, and the assignment management server 6 notifies the UE 1A and UE 1B of an assigned spread code. Further, the assignment management server 6 notifies the charging servers 4A and 4B of the assignment situation of the spread code. Alternatively, the assignment management server 6 further manages charging, and provides the charging information to the communication providers A and B.

As described above, in the eighth embodiment, the D2D communication can be performed across communication providers (carriers).

Other Embodiments

For example, the eNB 2 may assign the spread code to the UE 1 on the basis of an identifier associated with the UE 1. The identifier associated with the UE 1 is an IP address of the UE 1, an ID assigned by an application, or the like. The eNB 2 or the assignment management server 6 may assign at least a part of such UE-specific values to the UE 1 as the spread code. Alternatively, another spread code in one-to-one correspondence with at least a part of such UE-specific values may be assigned to the UE 1.

The code division multiplexing scheme may be applied for the Discovery signal. In this case, the eNB 2 broadcasts information indicating a spread code that should be used for the discovery process. The UE 1 applies the spread code indicated by the broadcast information to the Discovery signal, and transmits the Discovery signal.

The above-described embodiment and modification thereof may be performed separately and independently and may also be performed through a combination of two or more thereof.

In the above-described embodiment, the frequency band of the LTE system is divided into a frequency band for the cellular communication and a frequency band for the D2D communication. However, the frequency band for the cellular communication and the frequency band for the D2D communication may be overlapped at least at a part thereof.

In the above-described embodiment, the direct communication mode in the D2D communication is mainly described. However, instead of the direct communication mode, the locally routed mode may also be applied.

In the above-described embodiment, an example in which the present invention is applied to the LTE system is described. However, the present invention may also be applied to systems other than the LTE system, as well as the LIE system.

Thus, the present invention includes a variety of embodiments not described herein. Further, it is possible to combine embodiments and modifications described above. Therefore, the technical scope of the present invention is defined only by matters according to claims based on the above description.

The entire contents of U.S. Provisional Application No. 61/766,518 (filed on Feb. 19, 2013) are incorporated herein by reference.

INDUSTRIAL APPLICABILITY

According to the present invention, it is possible to provide a mobile communication system, a user terminal and a base station capable of facilitating an operation for the D2D communication.

The invention claimed is:

1. A mobile communication system that supports cellular communication in which a data path passes through a network and D2D communication that is direct device-to-device communication in which a data path does not pass through the network, wherein
the network assigns radio resources having orthogonality to a user terminal in response to a request from the user terminal,
the user terminal performs the D2D communication by using the radio resources assigned by the network,
the radio resources include a spread code,
the network controls a code length of the spread code to be assigned to the user terminal on the basis of at least one of communication quality of the D2D communication in the user terminal and the number of user terminals performing the D2D communication in a cell to which the user terminal belongs, and
when the network determines that the code length of the spread code to be assigned to the user terminal is longer than a predetermined length, the network instructs the user terminal to switch from the D2D communication to the cellular communication.

2. The mobile communication system according to claim 1, wherein
the user terminal retains an at least one initial spreading code having no orthogonality, and
the user terminal performs the D2D communication by using the at least one initial spreading code.

3. The mobile communication system according to claim 2, wherein
the user terminal performing the D2D communication by using the at least one initial spreading code requests the network to assign the radio resources in response to detection of deterioration in communication quality of the D2D communication.

4. The mobile communication system according to claim 3, wherein when the network determines that the communication quality will improve by assigning the radio resources, the network assigns the radio resources to the user terminal.

5. The mobile communication system according to claim 2, wherein
the user terminal performing the D2D communication by using the at least one initial spreading code performs transmission in the D2D communication on the basis of a result of monitoring an interference wave signal.

6. The mobile communication system according to claim 1, wherein
a valid time is set for the radio resources, and
the user terminal to which the radio resources are assigned requests the network to reassign the radio resources in order to continue the D2D communication.

7. The mobile communication system according to claim 6, wherein
the network controls the valid time on the basis of at least one of an elapsed time of the D2D communication by the user terminal, an application that the user terminal uses for the D2D communication, a billing contract of the user terminal, and movement speed of the user terminal.

8. The mobile communication system according to claim 6, wherein
the user terminal requests the network to reassign the radio resources in response to detection of deterioration in communication quality of the D2D communication, even before the valid time expires.

9. The mobile communication system according to claim 6, wherein
when the user terminal ends the D2D communication before the valid time expires, the user terminal notifies the network of the end of the D2D communication.

10. The mobile communication system according to claim 6, wherein
when reassigning the radio resources, the network assigns, to the user terminal, radio resources different from the radio resources before the reassignment.

11. The mobile communication system according to claim 1, wherein
the network assigns the radio resources to a user terminal group including the user terminal and another user terminal which is to perform the D2D communication with the user terminal.

12. The mobile communication system according to claim 11, wherein
the user terminal transmits the request to the network on the basis of an increase and decrease in the number of user terminals included in the user terminal group.

13. The mobile communication system according to claim 11, wherein
the network controls the number of radio resources to be assigned to the user terminal group on the basis of the number of user terminals included in the user terminal group.

14. The mobile communication system according to claim 11, wherein
the network denies the assignment of the radio resources to the user terminal group when a user terminal under a billing contract for which the D2D communication is not permitted is included in the user terminal group.

15. The mobile communication system according to claim 1, wherein
the network performs charging for the use of the radio resources by the user terminal.

16. The mobile communication system according to claim 1, wherein
the network assigns, to the user terminal, radio resources for transmission in the D2D communication and radio resources for reception in the D2D communication.

17. The mobile communication system according to claim 1, wherein
the network notifies the user terminal of transmission and reception start timing of the D2D communication by using, as a reference, timing of the cellular communication.

18. The mobile communication system according to claim 1, wherein
the network comprises a plurality of cells, and each of the plurality of cells notifies a neighboring cell of an assignment situation of the radio resources in the self cell.

19. The mobile communication system according to claim 1, wherein
the network assigns the radio resources to the user terminal on the basis of an identifier associated with the user terminal.

20. The mobile communication system according to claim 1, wherein
the user terminal performing the D2D communication by using the spread code as the radio resources performs transmission by applying the spread code to each of a plurality of subcarriers.

21. The mobile communication system according to claim 1, wherein
when the user terminal performing the D2D communication transmits data, the user terminal transmits information indicating an application corresponding to the data by adding the information to the data.

22. The mobile communication system according to claim 1, wherein
the network comprises a server device that is shared by a plurality of communication providers and that performs assignment of the radio resources.

23. A user terminal that is used in a mobile communication system that supports cellular communication in which a data path passes through a network, and D2D communication that is direct device-to-device communication in which a data path does not pass through the network, comprising:
a controller including a processor and a memory, the controller configured to perform the D2D communication by using radio resources assigned by the network in response to a request from the user terminal, the radio resources having orthogonality, wherein
the radio resources include a spread code,
a code length of the spread code to be assigned to the user terminal is controlled by the network controls on the basis of at least one of communication quality of the D2D communication in the user terminal and the number of user terminals performing the D2D communication in a cell to which the user terminal belongs, and
the controller is further configured to switch from the D2D communication to the cellular communication upon a determination that the code length of the spread code to be assigned to the user terminal is longer than a predetermined length.

24. A base station that is used in a mobile communication system that supports cellular communication in which a data path passes through a network, and D2D communication that is direct device-to-device communication in which a data path does not pass through the network, comprising:

a controller including a processor and a memory, the controller configured to assign radio resources having orthogonality to a user terminal in response to a request from the user terminal, the radio resources being used by the user terminal to perform the D2D communication, wherein the radio resources include a spread code, and the controller is further configured to:

control a code length of the spread code to be assigned to the user terminal on the basis of at least one of communication quality of the D2D communication in the user terminal and the number of user terminals performing the D2D communication in a cell to which the user terminal belongs, and instruct the user terminal to switch from the D2D communication to the cellular communication upon a determination that the code length of the spread code to be assigned to the user terminal is longer than a predetermined length.

* * * * *